US 9,843,396 B2

(12) United States Patent
Akiyama

(10) Patent No.: US 9,843,396 B2
(45) Date of Patent: Dec. 12, 2017

(54) OPTICAL TRANSMITTER, METHOD FOR CONTROLLING OPTICAL MODULATOR, AND CONTROLLER FOR OPTICAL MODULATOR

(71) Applicant: FUJITSU LIMITED, Kawasaki-shi, Kanagawa (JP)

(72) Inventor: Yuichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 55 days.

(21) Appl. No.: 14/877,047

(22) Filed: Oct. 7, 2015

(65) Prior Publication Data

US 2016/0105244 A1    Apr. 14, 2016

(30) Foreign Application Priority Data

Oct. 9, 2014    (JP) ................................. 2014-207983

(51) Int. Cl.
| | |
|---|---|
| *H04B 10/04* | (2006.01) |
| *H04B 10/12* | (2006.01) |
| *H04B 10/50* | (2013.01) |
| *H04B 10/588* | (2013.01) |
| *G02F 1/01* | (2006.01) |
| *G02F 1/225* | (2006.01) |

(52) U.S. Cl.
CPC ......... *H04B 10/50572* (2013.01); *G02F 1/01* (2013.01); *G02F 1/225* (2013.01); *H04B 10/5053* (2013.01); *H04B 10/588* (2013.01)

(58) Field of Classification Search
CPC ........ H04B 10/50572; H04B 10/50575; H04B 10/5563; H04B 10/556; H04B 10/505; H04B 10/5051; H04B 10/5053; H04B 10/50577; H04B 10/5162; H04B 10/5561; H04B 10/564; H04B 10/588; G02F 1/0123; G02F 1/2255; G02F 2001/212; G02F 1/225; G02F 1/01
USPC ......... 398/186, 185, 16, 192, 195, 198, 182, 398/183, 188, 197, 201
See application file for complete search history.

(56) References Cited

U.S. PATENT DOCUMENTS

| | | | | |
|---|---|---|---|---|
| 5,572,611 | A * | 11/1996 | Jinguji | G02B 6/12007 385/17 |
| 5,659,560 | A * | 8/1997 | Ouchi | B82Y 20/00 372/27 |
| 7,657,190 | B2 * | 2/2010 | Akiyama | G02F 1/2255 398/195 |
| 8,145,069 | B2 * | 3/2012 | Tanaka | H04B 10/505 398/182 |

(Continued)

FOREIGN PATENT DOCUMENTS

| | | |
|---|---|---|
| JP | 2007-208472 | 8/2007 |
| JP | 2008-092172 | 4/2008 |

(Continued)

*Primary Examiner* — Ken N Vanderpuye
*Assistant Examiner* — Abbas H Alagheband
(74) *Attorney, Agent, or Firm* — Fujitsu Patent Center

(57) ABSTRACT

An optical transmitter includes an optical modulator that is driven by a driving signal, an acquisition part, and a controller. The acquisition part obtains a relationship between a fluctuation of a parameter to adjust the driving signal and a fluctuation of a state of output light from the optical modulator due to the fluctuation of the parameter. The controller controls an amplitude of the driving signal on the basis of the obtained relationship.

15 Claims, 17 Drawing Sheets

(56) References Cited

U.S. PATENT DOCUMENTS

| | | | | |
|---|---|---|---|---|
| 8,457,503 B2* | 6/2013 | Akiyama | .............. | G02F 1/2255 |
| | | | | 398/188 |
| 9,564,975 B2* | 2/2017 | Akiyama | ................ | H04J 14/06 |
| 2003/0185575 A1* | 10/2003 | Ikeuchi | ................ | G02F 1/0123 |
| | | | | 398/197 |
| 2007/0177882 A1* | 8/2007 | Akiyama | .............. | G02F 1/2255 |
| | | | | 398/185 |
| 2008/0080872 A1* | 4/2008 | Tanaka | ................ | H04B 10/505 |
| | | | | 398/186 |
| 2010/0080571 A1* | 4/2010 | Akiyama | .............. | G02F 1/0123 |
| | | | | 398/184 |
| 2011/0026935 A1* | 2/2011 | Akiyama | ........... | H04B 10/5053 |
| | | | | 398/184 |
| 2011/0170877 A1* | 7/2011 | Akiyama | .............. | G02F 1/2255 |
| | | | | 398/185 |
| 2013/0101296 A1* | 4/2013 | Nishimoto | ........... | H04B 10/588 |
| | | | | 398/79 |
| 2013/0202315 A1* | 8/2013 | Akiyama | ............... | H04B 10/50 |
| | | | | 398/182 |
| 2014/0010530 A1* | 1/2014 | Goebuchi | .......... | H04B 10/5057 |
| | | | | 398/25 |
| 2016/0105244 A1* | 4/2016 | Akiyama | ......... | H04B 10/50572 |
| | | | | 398/186 |

FOREIGN PATENT DOCUMENTS

| | | |
|---|---|---|
| JP | 2010-226499 | 10/2010 |
| JP | 2011-217003 | 10/2011 |

* cited by examiner

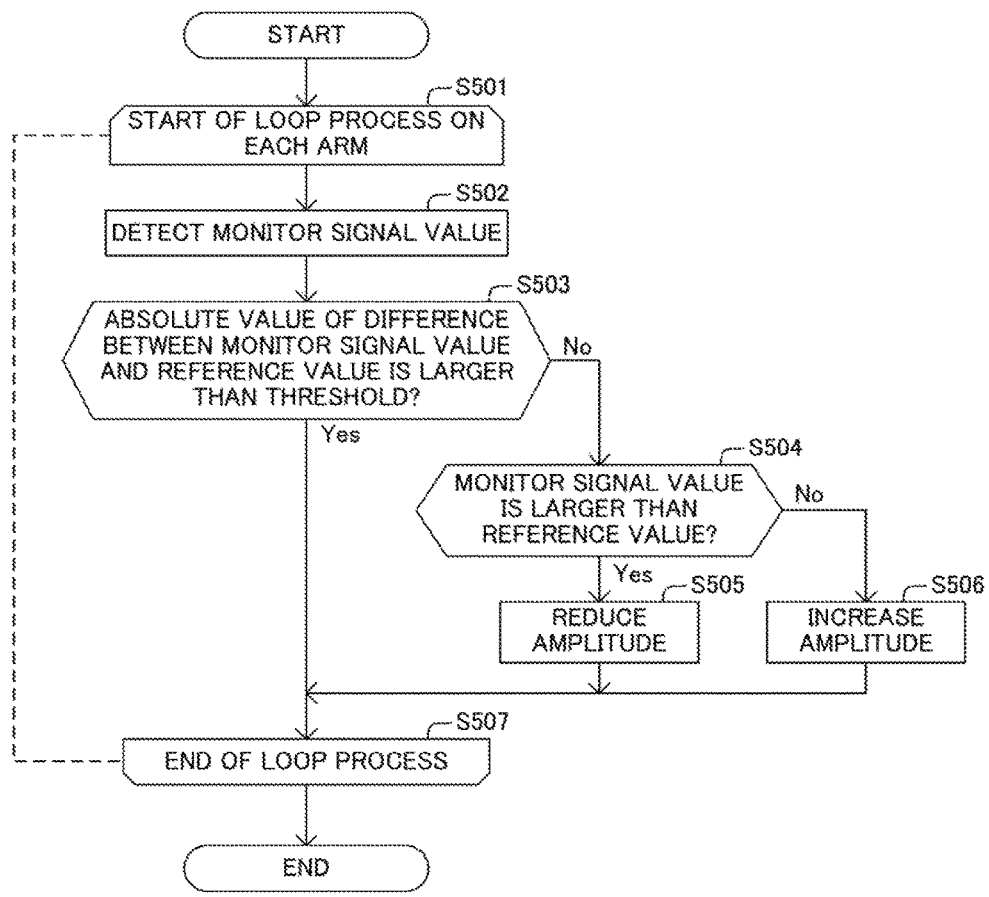

OPTICAL TRANSMITTER, METHOD FOR CONTROLLING OPTICAL MODULATOR, AND CONTROLLER FOR OPTICAL MODULATOR

CROSS-REFERENCE TO RELATED APPLICATION

This application is based upon and claims the benefit of priority of the prior Japanese Patent application No. 2014-207983, filed on Oct. 9, 2014, the entire contents of which are incorporated herein by reference.

FIELD

The embodiments discussed herein are related to an optical transmitter, a method for controlling an optical modulator, and a controller for an optical modulator.

BACKGROUND

An optical transmitter having an optical modulator whose light intensity with respect to a driving signal fluctuates at a predetermined periodic cycle (see Patent Literatures 1-3) has been known. The optical transmitters of Patent Literatures 1-3 each control the amplitude of the driving signal such that the output light from the optical modulator comes to be in a state corresponding to an amplitude of the driving signal corresponding to the above periodic cycle or a state corresponding to the half the amplitude of the driving signal corresponding to the above periodic cycle. The optical transmitter of Patent Literatures 1-3 each control the amplitude of the driving signal and a bias voltage to be applied to the optical modulator on the basis of the power of the output light from the optical modulator.

For example, the Quadrature Phase Shift Keying (QPSK) modulating scheme drives an optical modulator with a driving signal having an amplitude twice the amplitude corresponding to driving from the minimum point to the maximum point of a extinction curve. An extinction curve expresses the relationship between the light intensity and the value of the driving signal. The light intensity comes to be the minimum at the minimum point of an extinction curve and comes to be the maximum at the maximum point of the extinction curve. The amplitude corresponding to the driving from the minimum point to the maximum point of an extinction curve is also expressed by $V\pi$. The amplitude twice the amplitude corresponding to the driving from the minimum point to the maximum point of an extinction curve is also expressed by $2V\pi$.

Patent Literature 1: Japanese Laid-open Patent Publication No. 2008-92172
Patent Literature 2: Japanese Laid-open Patent Publication No. 2011-217003
Patent Literature 3: Japanese Laid-open Patent Publication No. 2007-208472

SUMMARY

In some cases, the output light from an optical modulator is in a state corresponding to an amplitude different from the amplitude of the driving signal corresponding to the above periodic cycle and from the half the amplitude of the driving signal corresponding to the above periodic cycle. For example, an optical modulator may be driven by a driving signal having an amplitude smaller than $2V\pi$. Driving an optical modulator by a driving signal having an amplitude smaller than $2V\pi$ is an example of driving the optical modulator in a linear region. In this case, the optical modulator has a difficulty in precisely controlling the output light from the optical modulator to be a target state, which consequently degrades the quality of the light signal.

According to an aspect of the embodiment, an optical transmitter includes an optical modulator that is driven by a driving signal, an acquisition part, and a controller. The acquisition part obtains a relationship between a fluctuation of a parameter to adjust the driving signal and a fluctuation of a state of output light from the optical modulator due to the fluctuation of the parameter. The controller controls an amplitude of the driving signal on the basis of the obtained relationship.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a flow diagram denoting an example of a succession of procedural steps performed by the controller according to a second embodiment.

DESCRIPTION OF EMBODIMENTS

Hereinafter, the embodiments of the present disclosure will be described with reference to the accompanying drawings. The following embodiments are exemplary, so there is no intention to exclude application of various modifications and techniques not suggested in the following description to the embodiments. Throughout accompanying drawings of the embodiments, like reference numbers designate the same or substantially identical parts and elements unless change or modification is specified.

First Embodiment

Figure 1:
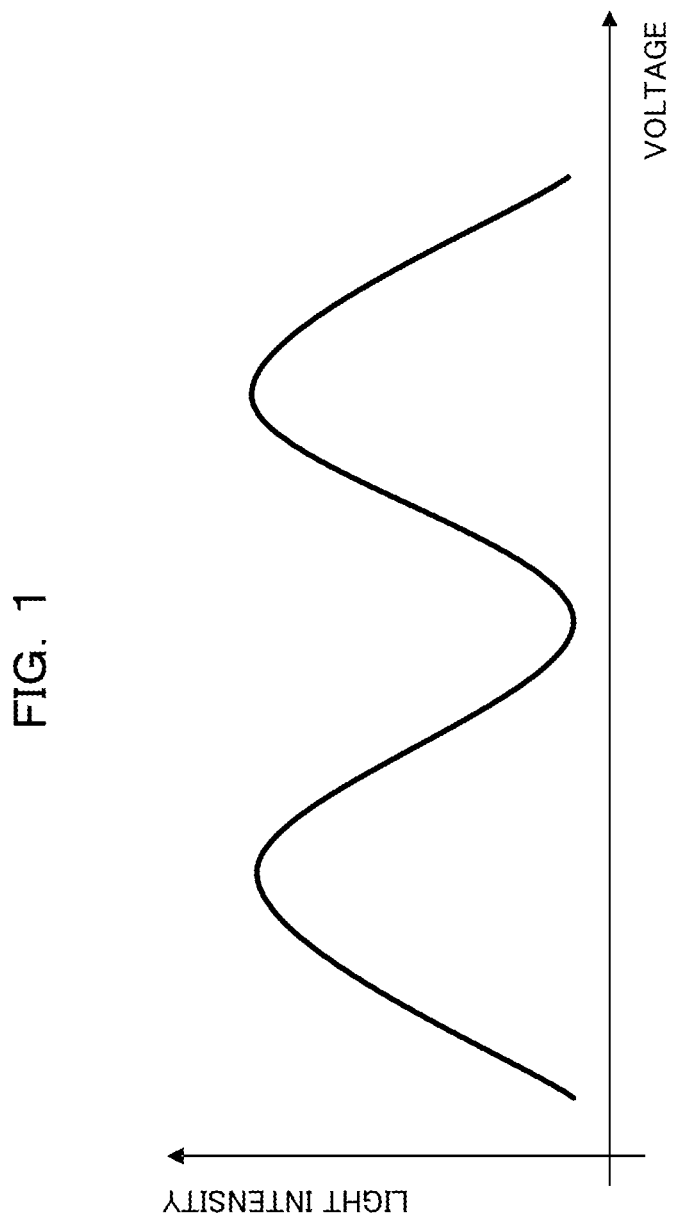
FIG. 1 is a graph denoting an example of a fluctuation of the light intensity of output light from an optical modulator with respect to the voltage of a driving signal.

FIG. 1 illustrates a fluctuation in intensity of a light signal output from an optical signal with respect to a voltage of a driving signal.

A fluctuation of the light intensity accompanied by a fluctuation of a voltage is different with a circumstance of using an optical modulator (for example, a largeness of an amplitude of a driving signal). Accordingly, influence of a fluctuation of the voltage on fluctuation of the quality of an optical signal varies with a circumstance of using an optical modulator.

Figure 2:
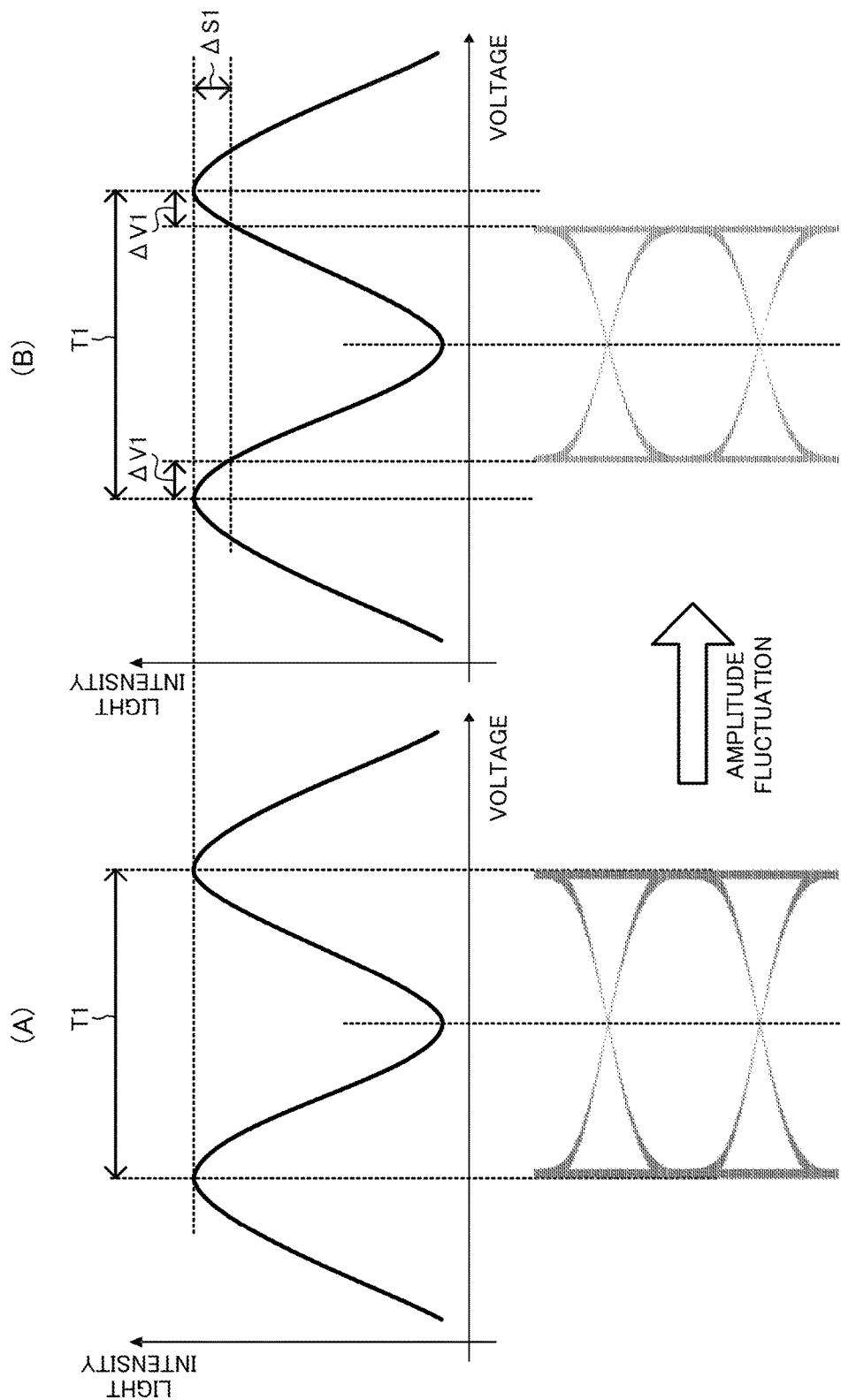
FIG. 2 is a graph denoting an example of a fluctuation of light intensity of output light from an optical modulator with respect to the voltage of a driving signal.

FIG. 2 illustrates a fluctuation of a light intensity accompanied by a fluctuation of the voltage of a driving signal when an optical modulator is driven with a driving signal amplitude corresponding to the width between two adjacent peaks of the light intensity. FIG. 2A illustrates a fluctuation of the light intensity accompanied by a fluctuation of the voltage of the driving signal when the optical modulator is driven with the driving signal amplitude T1 corresponding to a width between two adjacent peak of the light intensity characteristics. FIG. 2B illustrates a fluctuation of the light intensity accompanied by a fluctuation of the voltage of the driving signal when the optical modulator is driven with a driving signal amplitude smaller by 2ΔV1 than the driving signal amplitude T1. As illustrated in FIG. 2, decrease of the driving signal amplitude accompanies reduction of the maximum value of the light intensity output from the optical modulator by ΔS1.

Figure 3:
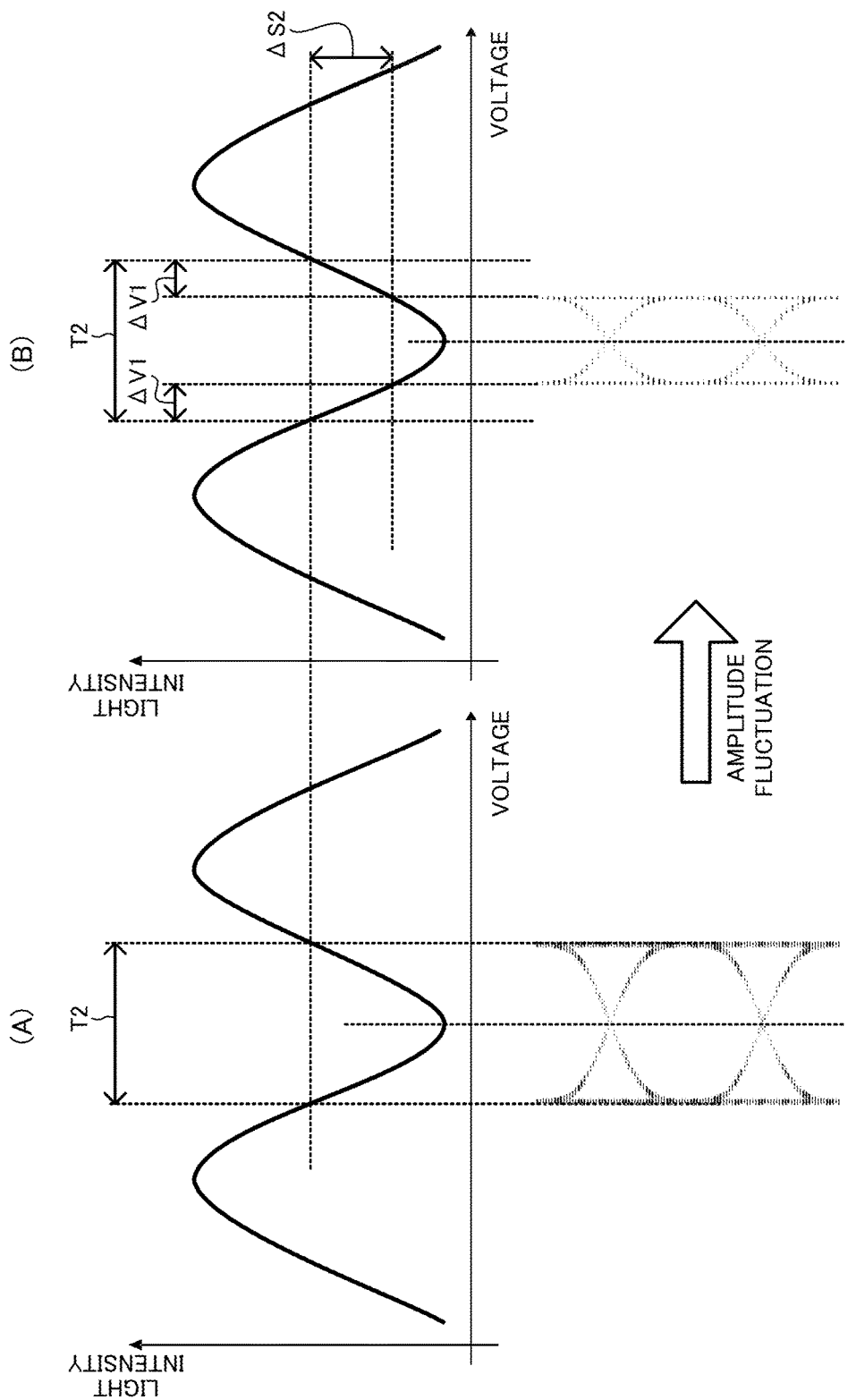
FIG. 3 is a graph denoting an example of a fluctuation of light intensity of output light from an optical modulator with respect to the voltage of a driving signal.

FIG. 3 illustrates a fluctuation of the light intensity accompanied by a fluctuation of the voltage of the driving signal when the optical modulator is driven at a driving signal amplitude about the half the driving signal amplitude T1. FIG. 3A illustrates a fluctuation of the light intensity accompanied by a fluctuation in a voltage of the driving signal when the optical modulator is driven at the driving signal amplitude T2 being the half the driving signal amplitude T1. FIG. 3B illustrates a fluctuation of the light intensity accompanied by a fluctuation in a voltage of the driving signal when the optical modulator is driven at a driving signal amplitude smaller by 2ΔV1 by the driving signal amplitude T2. Likewise the case of FIG. 2, decrease of the driving signal amplitude in FIG. 3 accompanies reduction of the maximum value of the light intensity output from the optical modulator by ΔS2, which is larger than the amount ΔS1 of FIG. 2.

When the optical signal is driven at a driving signal amplitude of FIG. 3, influence of dispersion in characteristics of arms that drive the optical modulator tends to become large. Consequently, the quality of a transmitting signal tends to easily degrade.

The following embodiments detects the variation of a driving signal amplitude among arms, and compensates for the variation, so that the quality of a transmitting signal can be enhanced.

(Overview)

The controller for an optical modulator according to the first embodiment includes an acquisition unit and a controller. The optical modulator is driven by the driving signal. The acquisition unit obtains a relationship between a fluctuation of a parameter to adjust the driving signal and a fluctuation of a state of the output light from the optical modulator accompanied by the fluctuation of the parameter. The controller controls the amplitude of a driving signal on the basis of the obtained relationship.

This configuration can control the amplitude of the driving signal such that the output light from the optical modulator is in a desired state, so that the output light from the optical modulator can be precisely controlled to be in a desired state. Accordingly, the quality of the light signal can be enhanced.

Hereinafter, description will now be made in relation to an optical transmitter according to the first embodiment.

(Configuration)

Figure 4:
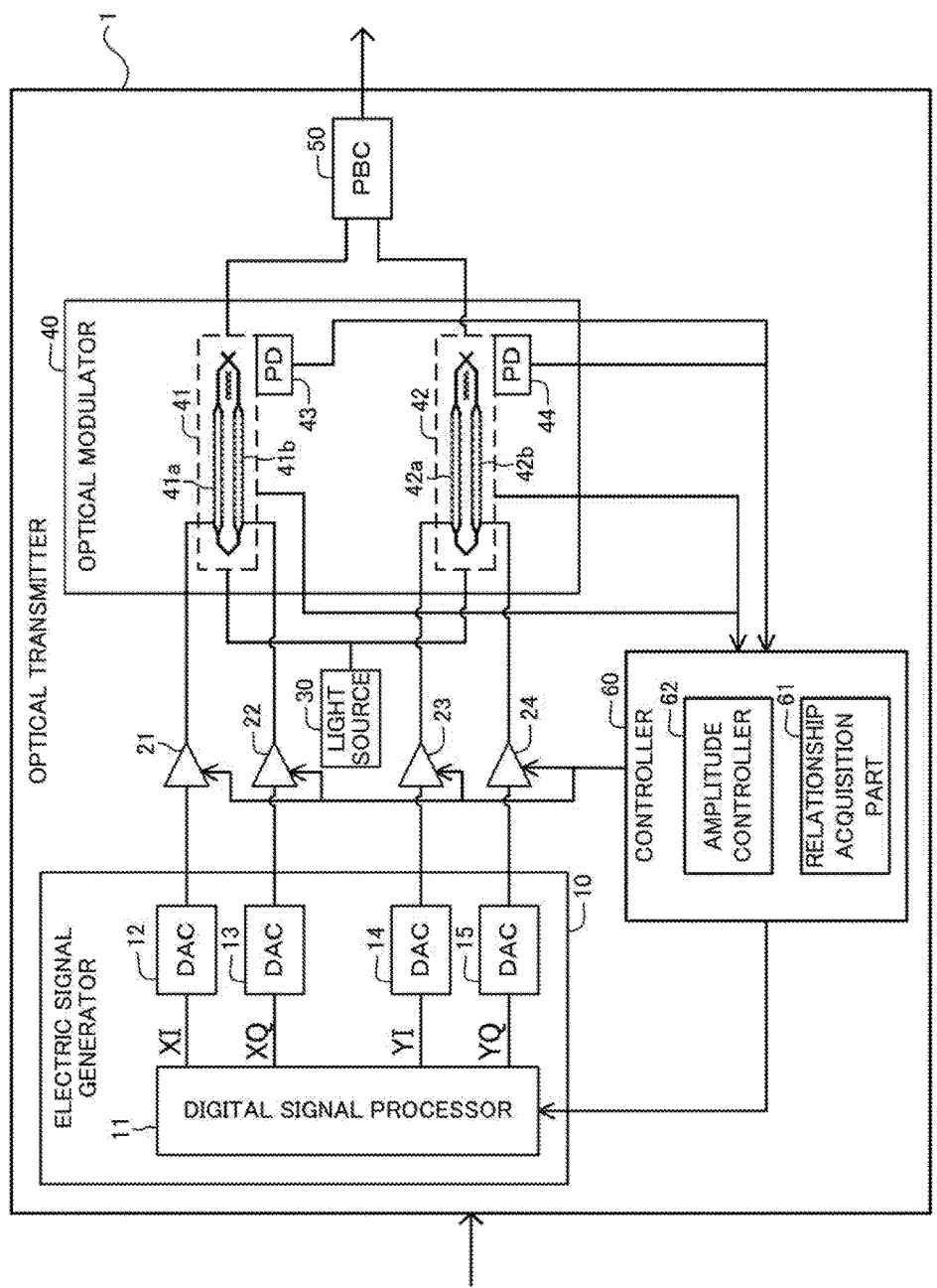
FIG. 4 is a block diagram schematically illustrating an example of the configuration of an optical transmitter according to a first embodiment.

As illustrated in FIG. 4, the optical transmitter 1 of the first embodiment exemplarily includes an electric signal generator 10, four amplifiers 21-24, a light source 30, an optical modulator 40, a Polarization Beam Combiner (PBC) 50, and a controller 60.

The electric signal generator 10 exemplarily includes a digital signal processor 11, and four Digital to Analog Converters (DACs) 12-15. The optical modulator 40 exemplarily includes two optical modulators 41 and 42, and two Photo Detectors (PDs) 43 and 44. A PD is here an example of a light detector.

The digital signal processor 11 generates first to fourth digital signals based on transmitted data input into the optical transmitter 1.

As to be detailed below, the optical modulator 41 of this embodiment generates an X polarization by modulating laser light on the basis of the first and second digital signals generated by the digital signal processor 11. Likewise, the optical modulator 42 generates a Y polarization by modulating laser light on the basis of the third and fourth digital signals generated by the digital signal processor 11. An X polarization is orthogonal to a Y polarization. In this embodiment, the X polarization and the Y polarization generated by the optical modulators 41 and 42 are linear polarization.

The digital signal processor 11 generates first and second digital signals, so that the optical modulator 41 can carry out modulation in conformity with a certain modulating scheme. Likewise, the digital signal processor 11 generates third and fourth digital signals, so that the optical modulator 42 can carry out modulation in conformity with a certain modulating scheme. Each of the first to fourth digital signals is an example of an electric signal.

The modulating scheme of this embodiment is multi-level modulation such as binary, quaternary, octonary, 16-level, or 64-level modulation. Examples of a modulating scheme are Quadrature Amplitude Modulation (QAM), Amplitude Shift Keying (ASK), Phase Shift Keying (PSK), and Quadrature PSK (QPSK).

In this embodiment, the modulation that each of the optical modulators 41 and 42 carries out is also referred to as IQ modulation and quadrature modulation.

In this embodiment, a first digital signal XI corresponds to the In-phase component (I component) of the X polarization; and a second digital signal XQ corresponds to the Quadrature-phase component (Q component) of the X polarization. Likewise, a third digital signal YI corresponds to the I component of Y polarization; and a fourth digital signal YQ corresponds to the Q component of the Y polarization.

The DACs 12-15 convert the first to fourth digital signals output from the digital signal processor 11 into first to fourth analog signals, respectively. The DACs 12-15 output the first to fourth analog signals into the amplifiers 21-24, respectively. The first to fourth analog signals are each an example of the electric signal.

The amplifiers 21-24 amplify the first to fourth analog signals output from the DACs 12-15, respectively. The amplifiers 21 and 22 output the amplified first and second analog signals, as first and second driving signals, into the optical modulator 41. Likewise, the amplifiers 23 and 24 output the amplified third and fourth analog signals, as first and second driving signals, into the optical modulator 42. In this embodiment, the first to fourth driving signals are each expressed in a voltage.

The light source 30 outputs laser light. Examples of the light source 30 are a semiconductor laser or a Laser Diode (LD).

For example, the optical modulators 41 and 42 are each a Mach-Zehnder optical modulator. The optical modulators 41 and 42 are driven by the first to fourth driving signals.

In this embodiment, the optical modulator 41 modulates the laser light output from the light source 30 using the first and second driving signals output from the amplifiers 21 and 22. In this embodiment, the optical modulator 41 includes two arms 41a and 41b. The optical modulator 41 branches the laser light output from the light source 30 into two. The arms 41a and 41b modulate the branched laser lights, respectively.

The arm 41a modulates the laser light on the basis of the first driving signal output from the amplifier 21. Likewise, the arm 41b modulates the laser light on the basis of the second driving signal output from the amplifier 22.

The optical modulator 41 multiplexes the laser lights respectively modulated by the two arms 41a and 41b. In the above manner, the optical modulator 41 generates an X polarization signal by carrying out IQ modulation on the laser light on the basis of the first and second driving signals. The optical modulator 41 outputs the generated X polarization signal to the PBC 50. Accordingly, the light output from the optical modulator 41 contains the component modulated by the arm 41a and the component modulated by the arm 41b.

The component modulated by the arm 41a among the output light from the optical modulator 41 is also referred to as output light from the arm 41a. Likewise, the component modulated by the arm 41b among the output light from the optical modulator 41 is also referred to as light output from the arm 41b.

Likewise, the optical modulator 42 modulates the laser light output from the light source 30 using the third and fourth driving signal output from the amplifiers 23 and 24. In this embodiment, the optical modulator 42 includes two arms 42a and 42b. The optical modulator 42 branches the laser light output from the light source 30 into two. The arms 42a and 42b modulates the respective laser lights branched.

The arm 42a modulates the laser light on the basis of the third driving signal output from the amplifier 23. Likewise, the arm 42b modulates the laser light on the basis of the fourth driving signal output from the amplifier 24.

The optical modulator 42 multiplexes the laser lights respectively modulated by the two arms 42a and 42b. In the above manner, the optical modulator 42 generates a Y polarization signal by carrying out IQ modulation on the laser light on the basis of the third and fourth driving signals. The optical modulator 42 outputs the generated Y polarization signal to the PBC 50. Accordingly, the light output from the optical modulator 42 contains the component modulated by the arm 42a and the component modulated by the arm 42b.

The component modulated by the arm 42a among the output light from the optical modulator 42 is also referred to as output light from the arm 42a. Likewise, the component modulated by the arm 42b among the output light from the optical modulator 42 is also referred to as light output from the arm 42b.

The four arms 41a, 41b, 42a, and 42b are each example of an optical modulator. The four arms 41a, 41b, 42a, and 42b are comprehensively referred to as the four arms 41a-42b.

The PBC 50 multiplexes the X polarization and the Y polarization obtained via line 70 and line 71 respectively output from the optical modulators 41 and 42. This is also referred to as "polarization multiplexing". The PBC 50 outputs a light signal obtained by the multiplexing.

The PDs 43 and 44 detect output lights from the optical modulators 41 and 42, respectively. In this embodiment, the PDs 43 and each convert detected output light into an electric signal and output the converted electric signal to the controller 60.

The controller 60 exemplarily includes a relationship acquisition part 61 and an amplitude controller 62. The relationship acquisition part 61 is an example of the acquisition part and the amplitude controller 62 is an example of the controller.

The relationship acquisition part 61 obtains first to fourth Input and output relations that are to be detailed below for each of the four arms 41a-42b.

In this embodiment, a first Input and output relation represents a relationship between a change of a parameter to adjust the first driving signal and a fluctuation of the output light from the arm 41a due to the fluctuation of the parameter. In other words, the first Input and output relation is a characteristic representing a fluctuation of a state of the output light from the arm 41a with respect to a fluctuation of a parameter that adjusts the first driving signal.

In this embodiment, a parameter that adjusts a driving signal (in this embodiment, a signal expressed in a voltage) includes an amplitude of the driving signal and a value to set the center of the driving signal. In this embodiment, the voltage value that sets the center of a driving signal is also referred to as a bias voltage.

A driving signal fluctuates in response to the adjustment of the parameter. Accordingly, the parameter of this embodiment is expressed in an amount representing the characteristic of a driving signal and here corresponds to the value of a monitor signal. For the above, the parameter is also referred to as a monitor signal value. A monitor signal value of this embodiment corresponds to the amplitude of a driving signal. Alternatively, a monitor signal value may be a value corresponding to the power of the driving signal.

In this embodiment, a state of the output light is represented by an amplitude of a corresponding driving signal. The amplitude of a driving signal is also referred to as a driving signal amplitude and a fluctuation amount of a value of a driving signal. A value of a driving signal is also referred to as a driving signal value. In this embodiment, the amplitude of a driving signal corresponding to a state of output signal is also referred to as a driving signal amplitude converted from output light.

For the above, the first Input and output relation of this embodiment represents a relationship between a fluctuation of a monitor signal value for the first driving signal and a fluctuation of the driving signal amplitude converted from the output light from the arm 41a accompanied by the fluctuation of the monitor signal value.

Likewise, the second Input and output relation of this embodiment represents a relationship between a fluctuation of a monitor signal value for the second driving signal and a fluctuation of the driving signal amplitude converted from the output light from the arm 41b accompanied by the fluctuation of the monitor signal value.

The third Input and output relation of this embodiment represents a relationship between a fluctuation of a monitor signal value for the third driving signal and a fluctuation of the driving signal amplitude converted from the output light from the arm 42a accompanied by the fluctuation of the monitor signal value, and the fourth Input and output relation of this embodiment represents a relationship between a fluctuation of a monitor signal value for the fourth driving signal and a fluctuation of the driving signal amplitude converted from the output light from the arm 42b accompanied by the fluctuation of the monitor signal value.

Description will now be made in relation to obtaining of the first to fourth Input and output relations. First of all, the characteristics of the optical modulators 41 and 42 are detailed.

As illustrated in FIG. 1, the light intensity of the output light from the arm 41a of this embodiment fluctuates at a predetermined cycle T1 with respect to the first driving signal. For example, the light intensity of output light fluctuates in substantial proportion to the square of the cosine function using the driving signal value as a variable. In this embodiment, a fluctuation of the light intensity of output light with respect to a driving signal is also referred to as a extinction characteristic.

The light intensities of the output lights from the remaining arms 41b, 42a, and 42b fluctuate likewise that from the arm 41a.

The Input and output relations vary due to, for example, production tolerance and individual differences of the electric signal generator 10 that generates signals to drive the optical modulators 41 and 42 and the amplifiers 21-24, and the optical modulators 41 and 42. Accordingly, the relationship acquisition part 61 estimates driving signal amplitudes converted from output lights on the basis of the output light detected by the PDs 43 and 44 obtained via line 72 and line 73 respectively and obtains the Input and output relations by detecting the monitor signal values.

As to be detailed below, when a driving signal amplitude is an amplitude calculated by multiplying a coefficient with the amplitude of the driving signal having the above cycle, the driving signal amplitude can be precisely estimated using the output lights detected by the PDs 43 and 44. Examples of the coefficient are ½, ¾, or 1.

When driving signal amplitudes converted from respective output lights are estimated to correspond to the first to fourth reference amplitudes for each of the arms 41a-42b, the relationship acquisition part 61 of the this embodiment stores the reference amplitudes and the monitor signals for each of the arms 41a-42b in association with each other. This can be regarded as an example of a case where the output light is in a state corresponding to the reference amplitude.

Figure 5:
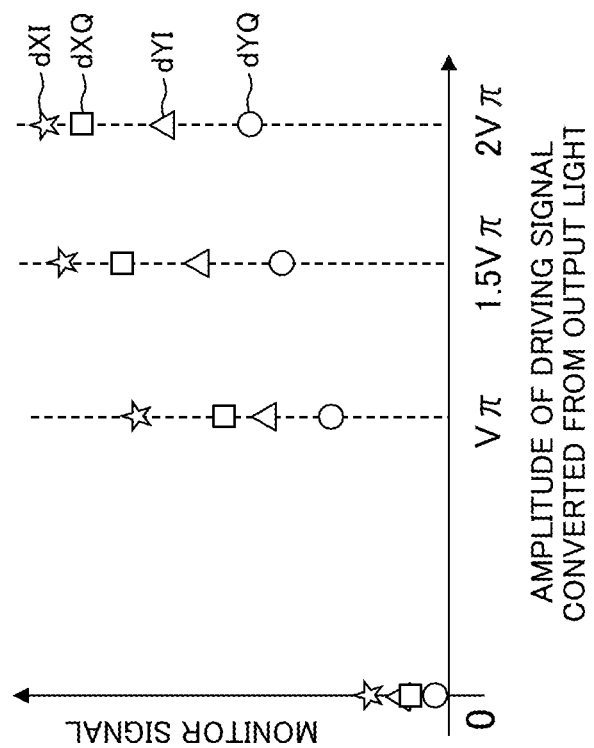
FIG. 5 is a graph denoting an example of a relationship between a monitor signal and a driving signal amplitude converted from output light.

As illustrated in FIG. 5, the relationship acquisition part 61 stores monitor signal values dXI, dXQ, dYI, and dYQ for the arms 41a, 41b, 42a, and 42b, respectively.

For example, the monitor signal values may be detected through the output terminals of the amplifiers 21-24. In this case, the relationship acquisition part 61 may obtain the driving signals through the output terminals and derive the monitor signals on the basis of the obtained driving signals.

In this embodiment, a first reference amplitude is a product obtained by multiplying the amplitude of a driving signal corresponding to the periodic cycle by zero, which means that the first reference amplitude is zero. Meanwhile, a second reference amplitude is an amplitude $V\pi$ obtained by multiplying the amplitude of a driving signal corresponding to the periodic cycle by ½.

A third reference amplitude is an amplitude $2V\pi$ obtained by multiplying the amplitude of a driving signal corresponding to the periodic cycle by 1 while a fourth reference amplitude lies near to an amplitude $1.5V\pi$ obtained by multiplying the amplitude of a driving signal corresponding to the periodic cycle by ¾. In this embodiment, a reference amplitude is also referred to as a reference fluctuation amount.

A method of estimating a driving signal amplitude converted from output light for each reference amplitude will be detailed below.

The number of reference amplitudes at which monitor signal values are detected may be three or less, or five or more. A reference amplitude is derived by multiplying the amplitude of a driving signal having the cycle by a coefficient except for 0, ½, ¾, and 1. For example, a coefficient may be ⅗.

The relationship acquisition part 61 obtains the relationships for the respective arms 41a-42b by polynominal approximation based on the stored reference amplitudes and monitor signal values stored therein. Here, the polynominal used here may be of quadratic, cubic, or quartic. For example, the polynominal may be obtained by a least square method.

Figure 6:
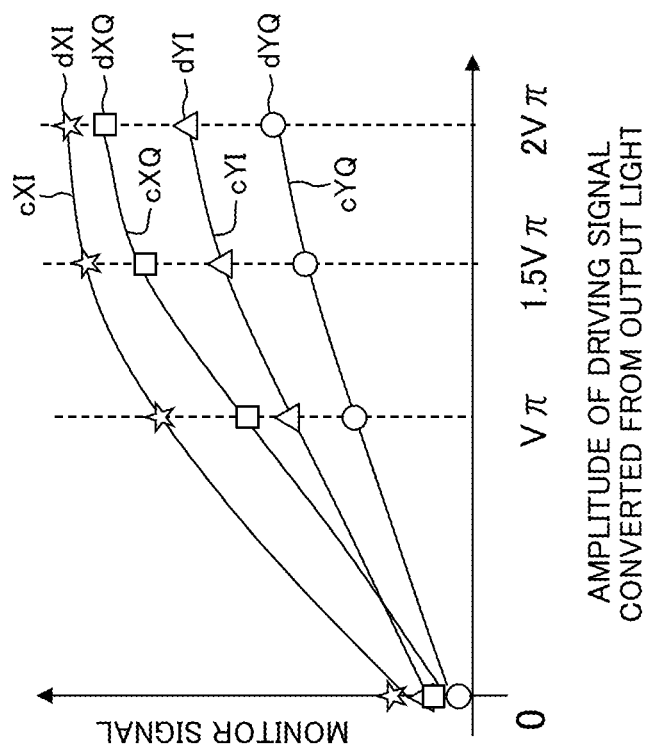
FIG. 6 is a graph denoting an example of a relationship between a monitor signal and a driving signal amplitude converted from output light.

FIG. 6 depicts example of curves cXI, cXQ, cYI, and cYQ respectively expressed by a polynominal representing the first to fourth Input and output relations of the arms 41a, 41b, 42a, and 42b.

The amplitude controller 62 controls the amplitudes of the driving signals on the basis of the Input and output relations that the relationship acquisition part 61 obtains for the respective arms 41a-42b via line 74 and line 75 respectively.

In this embodiment, the driving signals to control the respective driving signal amplitudes are different from the driving signals to obtain the Input and output relations. For example, a driving signal to control the driving signal amplitude is arbitrary data such as user data, and in this embodiment, is predetermined data. In other words, a driving signal for obtaining an Input and output relation has a predetermined pattern in this embodiment.

In this embodiment, the driving signals to control the driving signal amplitudes adopt a modulating scheme having a multilevel degree higher than that used by the driving signals to obtain the Input and output relation. The multilevel degree of this embodiment represents the number of bit strings being different from one another and being represented by a single modulation symbol. Alternatively, the multilevel degree may be the number of bits represented by a single symbol.

In this embodiment, a driving signal to obtain an Input and output relation uses a binary or quaternary modulating scheme while a driving signal to control a driving signal amplitude uses, for example, 8-level, 16-level, or 64-level modulating scheme. Alternatively, a driving signal to control a driving signal amplitude may use a modulating scheme having the same multilevel degree as the modulating scheme that a driving signal to obtain an Input and output relation uses.

In this embodiment, the amplitude controller 62 uses the arm 41a as a reference arm. The arm 41a is an example of a first optical modulator. Among the four arms 41a-42b, the remaining arms 41b, 42a, and 42b are also referred to as non-reference arms, which are examples of a second optical modulator.

Alternatively, the amplitude controller 62 may use any of arms 41b, 42a, and 42b as the reference arm. In some cases, the upper limit of an output of an amplifier makes it difficult to control the amplitude of a driving signal of a non reference arm to be the target value. To solve this inconvenience, the possibility of controlling the amplitude of a driving signal of a non-reference arm to be the target value can be enhanced by changing an arm being used as the reference arm.

Figure 7:
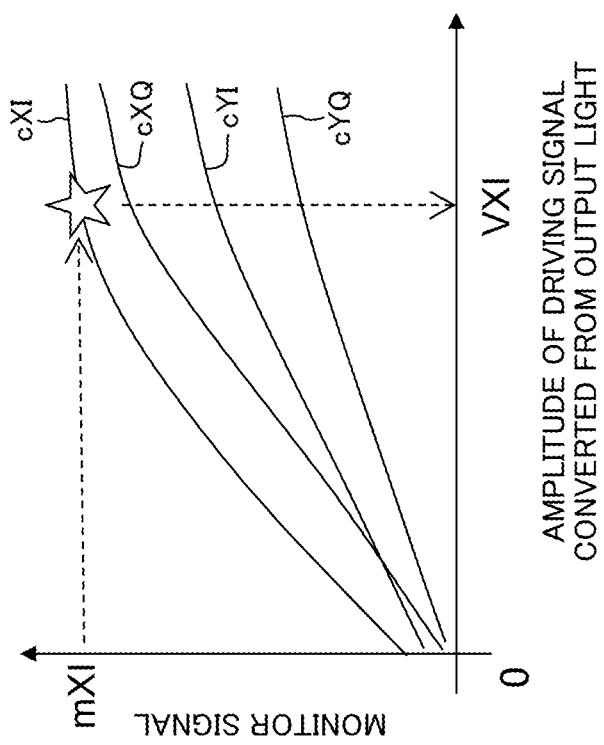
FIG. 7 is a graph denoting an example of a relationship between a monitor signal value and a target amplitude.

As illustrated in FIG. 7, the amplitude controller 62 detects a monitor signal value mXI of the reference arm 41a. The amplitude controller 62 determines the target amplitude VXI on the basis of the first Input and output relation cXI obtained for the reference arm 41a and the monitor signal value mXI obtained for the reference arm 41a. The target amplitude is the target value of a driving signal amplitude converted from output light. In this embodiment, the target amplitude corresponds to a target state of output light, and the target amplitude VXI is different from the first to fourth reference amplitudes. However, the target amplitude VXI may alternatively be the same as one of the first to fourth reference amplitudes.

Figure 8:
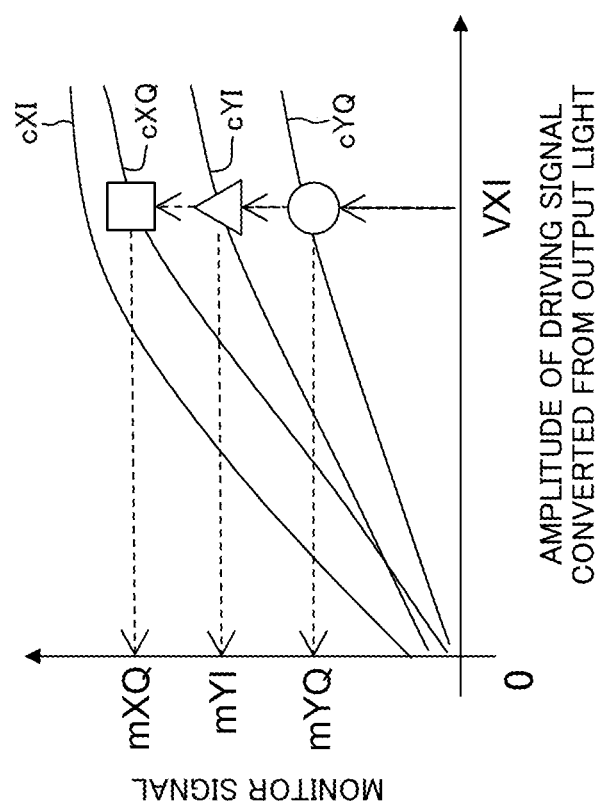
FIG. 8 is a graph denoting an example of a relationship between a target monitor signal value and a target amplitude.

As depicted in FIG. 8, the amplitude controller 62 obtains target monitor signal values mXQ, mYI, and mYQ on the basis of the determined target amplitude VXI and the second to fourth relationship cXQ, cYI, and cYQ obtained for the non-reference arms 41b, 42a, and 42b. A target monitor signal value is the target value of a monitor signal and, in this embodiment, corresponds to a target parameter being a target value of the parameter to adjust the driving signal.

The amplitude controller 62 controls the amplitudes of the driving signals for the non-reference arms 41b, 42a, and 42b such that the monitor signal values for the non-reference arms 41b, 42a, and 42b approach the respective determined target monitor signal values mXQ, mYI, and mYQ, respectively. For example, when the monitor signal value is smaller than the target monitor signal value, the amplitude controller 62 increases the amplitude of the driving signal while when the monitor signal value is larger than the target monitor signal value, the amplitude controller 62 decreases the amplitude of the driving signal.

For example, the amplitude controller 62 may omit control on the amplitude of the driving signal for part of the non-reference arms 41b, 42a, and 42b.

The amplitude controller 62 may hold the target amplitudes beforehand and may determine the target monitor signal values for arms 41a-42b on the basis of the held target amplitudes and the first to fourth Input and output relations cXI, cXQ, cYI, and cYQ. In this case, the amplitude controller 62 may be allowed not to set one of the arms 41a-42b to be the reference arm. Furthermore, the amplitude controller 62 may be allowed not to control an amplitude of a driving signal for part of the arms 41a-42b.

In this embodiment, the control on the amplitude of a driving signal is accomplished by controlling the digital signal processor 11 via line 76. Alternatively, the control on the amplitude of a driving signal may be accomplished by controlling the amplifiers 21-24 or by controlling both the digital signal processor 11 and the amplifiers 21-24.

For example, the control on the amplifiers 21-24 may be achieved through the input terminals of the amplifiers 21-24. For example, control signals to control the amplitudes of driving signals to be output from the amplifiers 21-24 are input through the input terminals of the amplifiers 21-24.

Here, description will now be made in relation to a method of estimating "a driving signal amplitude converted from output light" for each reference amplitude.

Firstly, description will now be made in relation to a method of estimating "a driving signal amplitude converted from output light" at the first reference amplitude 0.

The relationship acquisition part 61 controls the digital signal processor 11 and/or the amplifiers 21-24 such that the amplitudes of the driving signals come to be zero. In this embodiment, the control on the amplitudes is achieved by the relationship acquisition part 61 outputting control signals to the input terminals of the amplifiers 21-24. The relationship acquisition part 61 may control the digital signal processor 11 and/or the amplifiers 21-24 such that the driving signals are not input into the optical modulators 41 and 42.

In this case, the output lights from the arms 41a-42b are in the state corresponding to a first reference amplitude 0 (zero). Accordingly, the relationship acquisition part 61 estimates that the driving signal amplitudes converted from the output light are the first reference signal 0.

Next, description will now be made in relation to a method of estimating "a driving signal amplitude converted from the output light" at the second reference amplitude $V\pi$.

Figure 9:
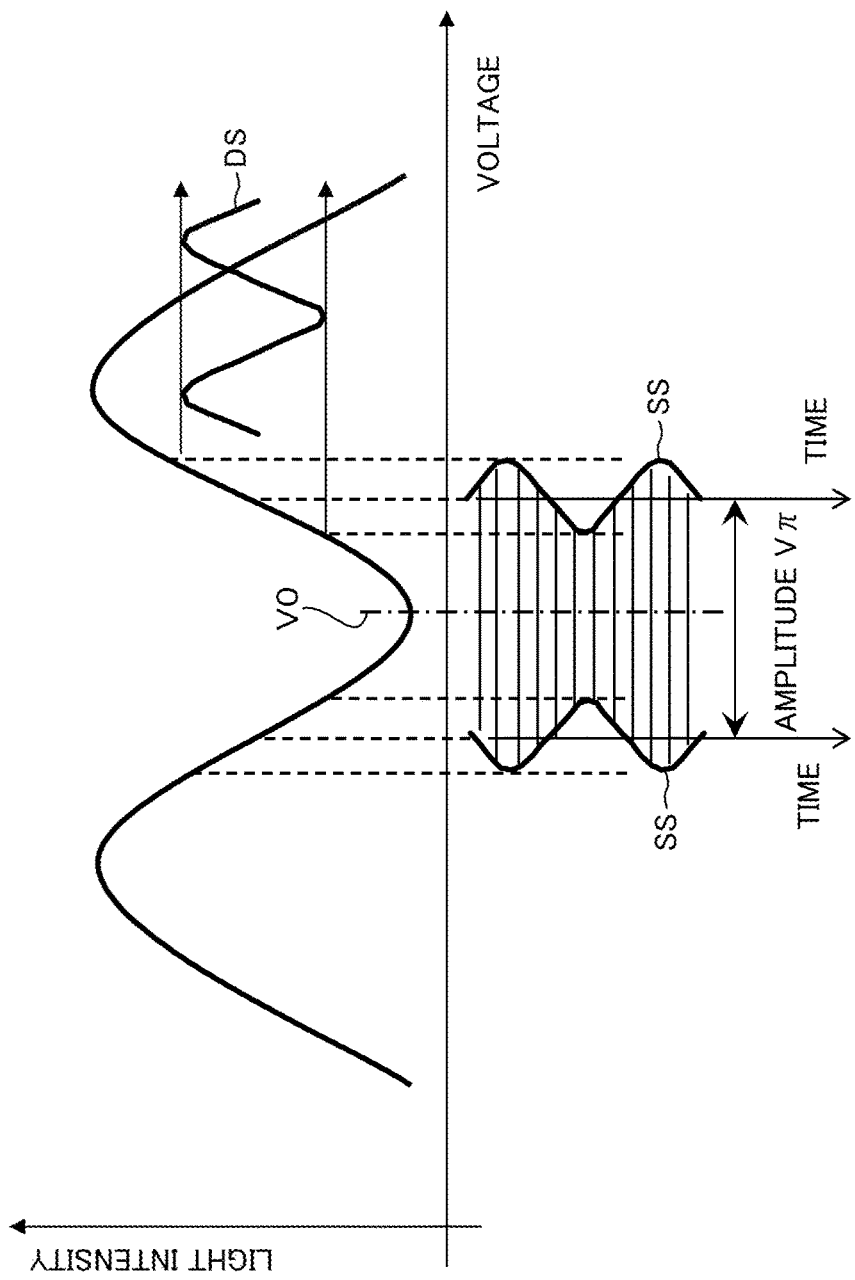
FIG. 9 is a diagram illustrating a method for estimating a driving signal amplitude converted from output light for a second reference amplitude.

As depicted in FIG. 9, the relationship acquisition part 61 controls the bias voltage to a certain reference bias voltage V0, which minimizes the light intensity in this embodiment.

Alternatively, the reference bias voltage may be one that maximizes the light intensity.

The control on the bias voltage may be accomplished by, for example, a method described in Patent Literature 3. The relationship acquisition part 61 may detect the intensities of output lights from the arms 41a-42b for various different voltages as candidates of the bias voltage, and determine one of the candidates that is related to the minimum detected light intensity to be the reference bias voltage V0.

The relationship acquisition part 61 controls a driving signal to be a binary signal. In this embodiment, the relationship acquisition part 61 controls the digital signals generated by the digital signal processor 11 such that the optical modulators 41 and 42 can carry out modulation in conformity with a binary modulating scheme (in this embodiment, Non Return to Zero (NRZ) scheme).

Furthermore, the relationship acquisition part 61 controls the digital signal processor 11 and/or the amplifiers 21-24 such that the amplitude of the driving signal oscillates at a frequency $f_0$ lower than the operating frequency of the driving signal. In this embodiment, this control on the amplitude is accomplished by the relationship acquisition part 61 outputting control signals to the input terminals of the amplifiers 21-24. Here, the frequency $f_0$ is an example of the second frequency lower than the frequency of the driving signal. Oscillating the amplitude of a driving signal at the frequency $f_0$ is also referred to as superimposing a signal having a low frequency $f_0$ onto the driving signal.

Consequently, as illustrated in FIG. 9, the output lights from the arms 41a-42b each include a component DS having the frequency $f_0$ corresponding to a signal SS having the low frequency $f_0$ to be superimposed on the driving signal. The component having the frequency $f_0$ is also referred to as a frequency-$f_0$ component.

When the power of the frequency-$f_0$ component comes to be the maximum among the output lights from the arms 41a-42b under a state where the amplitude of the driving signal fluctuates due to a fluctuation of the operating frequency of the driving signal within a certain second range, the relationship acquisition part 61 estimates that the driving signal amplitude converted from the output light is the second reference amplitude $V\pi$.

For example, the relationship acquisition part 61 increases the amplitude for the operating frequency of the driving signal within the second range with certain increments (e.g., 0.1V). Estimating that the driving signal amplitude converted from the output light is the reference amplitude is an example of determining that the output light is in a state corresponding to the reference amplitude.

In the above manner, the relationship acquisition part 61 can estimate that the driving signal amplitude converted from the output light is the second reference amplitude $V\pi$.

Next, description will now be made in relation to a method of estimating "a driving signal amplitude converted from output light" at the third reference amplitude $2V\pi$.

Figure 10:
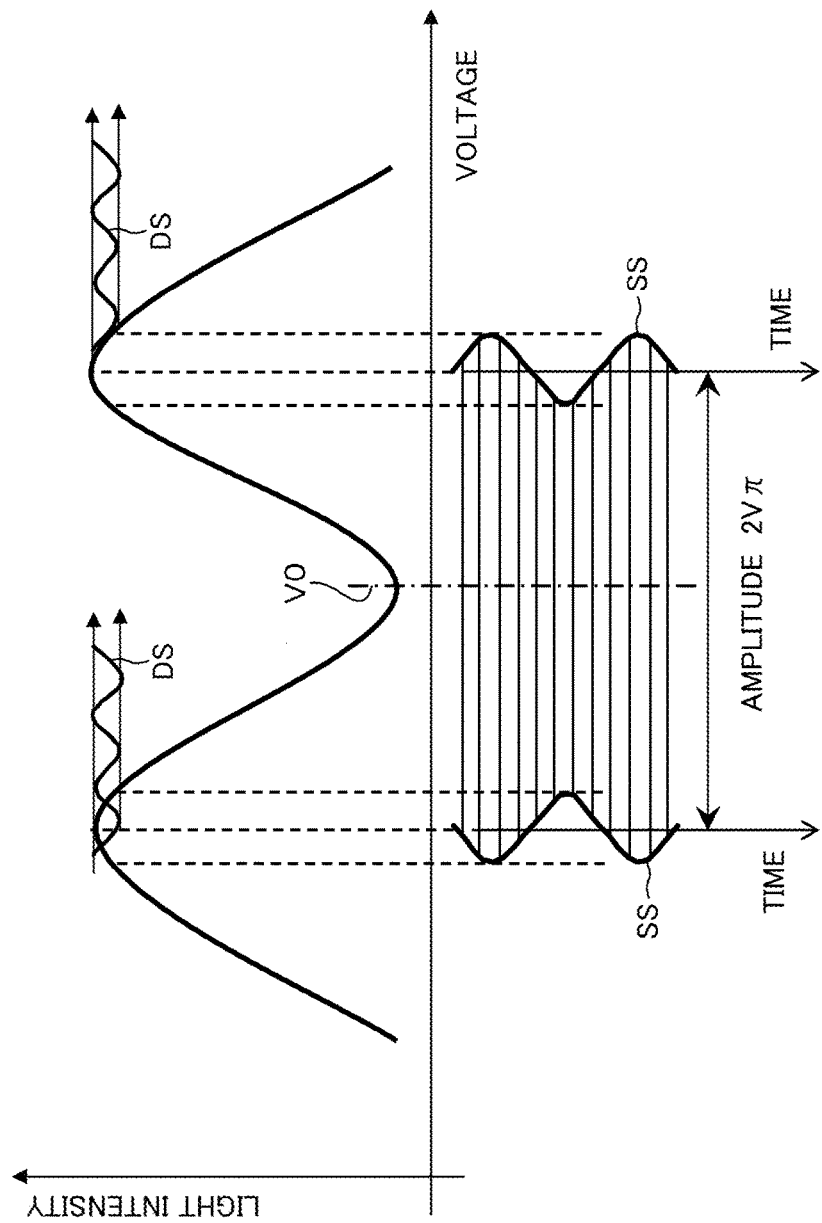
FIG. 10 is a diagram illustrating a method for estimating a driving signal amplitude converted from output light for a third reference amplitude.

As depicted in FIG. 10, the relationship acquisition part 61 controls the bias voltage to the above reference bias voltage V0 and controls the driving signal to be a binary signal, likewise the estimation at the second reference amplitude $V\pi$.

Likewise the estimation at the second reference amplitude $V\pi$, the relationship acquisition part 61 controls the digital signal processor 11 and/or the amplifiers 21-24 such that the amplitude for the operating frequency of the driving signal oscillates at a frequency $f_0$ lower than the operating frequency of the driving signal. Here, the frequency $f_0$ is an example of the third frequency. In this embodiment, the third frequency is the same as the second frequency, but alternatively may be different from the second frequency.

Consequently, as illustrated in FIG. 10, the output lights from the arms 41a-42b each include a component DS having a frequency $2f_0$ twice the frequency $f_0$ corresponding to a signal SS having the low frequency $f_0$ to be superimposed onto the driving signal and the frequency-$f_0$ component.

When at least one of first and second conditions is satisfied under a state where the amplitude of the operating frequency of the driving signal fluctuates within a certain third range, the relationship acquisition part 61 estimates that the driving signal amplitude converted from the output light is a third reference amplitude $2V\pi$. The first condition is that the power of the frequency-$f_0$ component among the output lights from the arms 41a-42b is minimum; and the second condition is that the power of the frequency-$2f_0$ component among the output lights from the arms 41a-42b is maximum.

In the above manner, the relationship acquisition part 61 can estimate that the driving signal amplitude converted from the output light is the third reference amplitude $2V\pi$.

Next, description will now be made in relation to a method of estimating "a driving signal amplitude converted from output light" at an amplitude near the fourth reference amplitude $1.5V\pi$.

Figure 11:
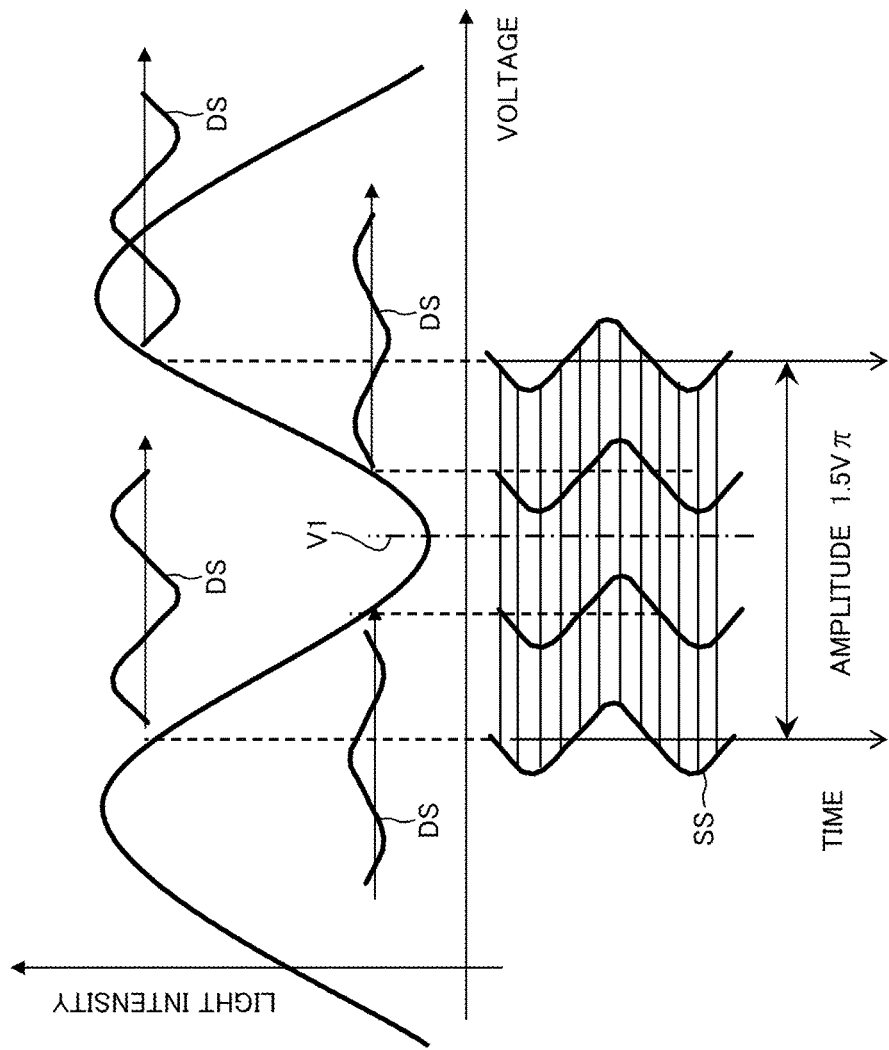
FIG. 11 is a diagram illustrating a method for estimating a driving signal amplitude converted from output light for a fourth reference amplitude.
Figure 12:
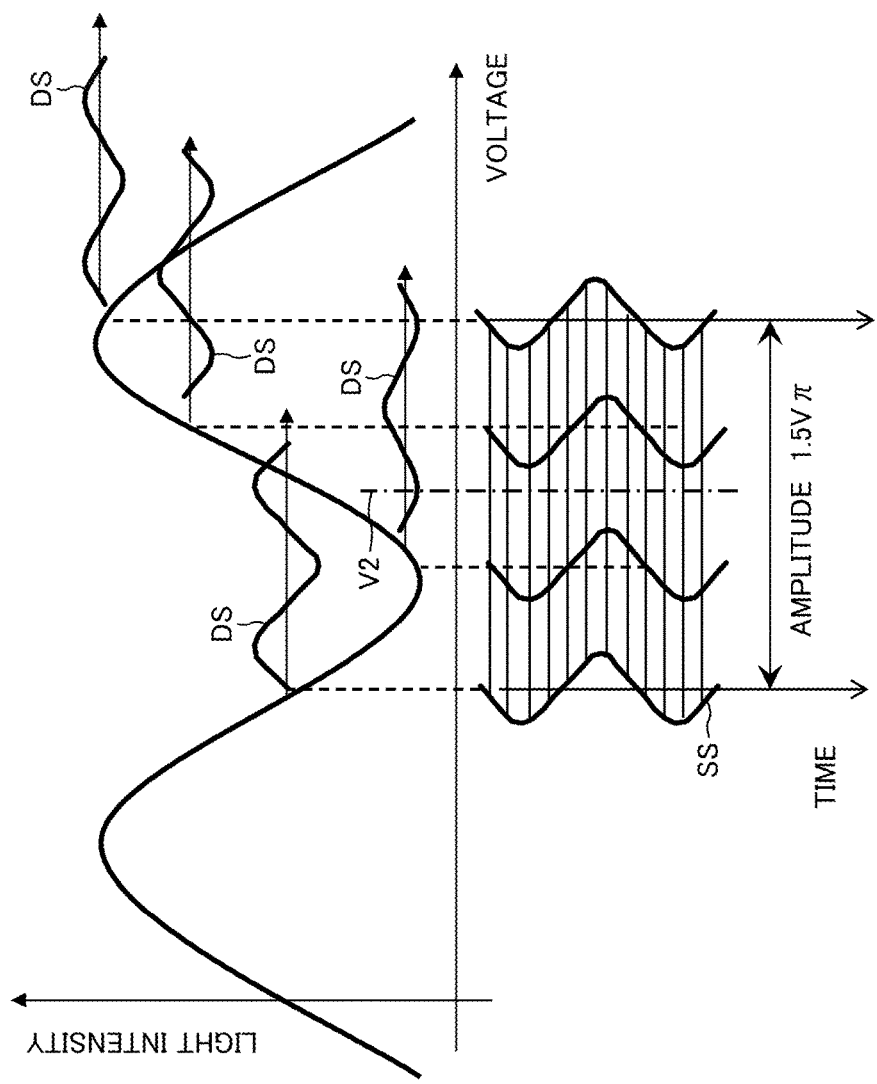
FIG. 12 is a diagram illustrating a method for estimating a driving signal amplitude converted from output light for a fourth reference amplitude.

As denoted in FIGS. 11 and 12, the relationship acquisition part 61 controls the driving signal to a quaternary signal. In this embodiment, the relationship acquisition part 61 controls the digital signals generated by the digital signal processor 11 such that the optical modulators 41 and 42 can carry out modulation in conformity with a 4-level modulating scheme.

Furthermore, the relationship acquisition part 61 controls the digital processor and/or the amplifiers 21-24 so as to oscillate the bias voltage at a frequency $f_1$ lower than the operating frequency of the driving signal with respect to the basic bias voltage V1 or V2 as the center of the oscillation. A bias voltage is a center voltage for the operating frequency of a driving signal.

This control on the bias voltage is accomplished by the relationship acquisition part outputting control signals to the input terminals of the amplifiers 21-24. The frequency $f_1$ is an example of the first frequency. In this embodiment, the first frequency is the same as the second and third frequencies, but alternatively may be different from the second and third frequencies. Oscillating the bias voltage at the frequency $f_1$ is also referred to as superimposing a signal having a low frequency $f_1$ onto the driving signal. The bias voltage can be understood as a voltage applied to the optical modulator.

Thereby, as denoted in FIGS. 11 and 12, the output lights from the arms 41a-42b each include a component DS having the low frequency $f_1$ corresponding to a signal SS having the frequency $f_1$ to be superimposed on the driving signal. The component having the frequency $f_1$ is also referred to as a frequency-$f_1$ component.

When an amount of power fluctuation is minimized under a state where the amplitude of the driving signal for the operating frequency of the driving signal within a certain first range, the relationship acquisition part 61 estimates that the driving signal amplitude converted from the output light is near to the fourth reference amplitude $1.5V\pi$. The amount of power fluctuation represents an amount of fluctuation of the power of the frequency-$f_1$ component among the output light of the arms 41a-42b when the basic bias voltage fluctuates in a certain range.

For example, the relationship acquisition part 61 increases the basic bias voltage within a voltage range with certain increments (e.g., 1V). The amount of power fluctuation becomes smaller as the power of a frequency-$f_1$ component among the output light less fluctuates.

In the above manner, the relationship acquisition part 61 can estimate the driving signal amplitude converted from the output light is near to the fourth reference amplitude $1.5V\pi$.

The functions of each of the electric signal generator 10 and the controller 60 of FIG. 4 may be achieved by means of a Large Scale Integration (LSI). Each of the digital signal processor 11 and the controller 60 may be achieved by a programmable logic circuit such as a Programmable Logic Device (PLD) or a Field-Programmable Gate Array (FPGA).

The optical transmitter 1 may include a processor and a memory in place of the digital signal processor 11 and the controller 60. In this case, the functions of the digital signal processor and the controller 60 may be achieved by the processor executing a program stored (recorded) in the memory. An example of the processor is a Digital Signal Processor (DSP).

The digital signal processor 11, the DACs 12-15, the amplifiers 21-24, the optical modulator 40, the PBC 50, and the controller 60 may be devices independent of one another or may at least partially be an integrated device.

The optical transmitter 1 may send an optical signal conforming to the Wavelength Division Multiplexing (WDM) scheme. In this embodiment, the optical transmitter 1 carries out polarization multiplexing, which may be omitted. In this case of the omission, the optical transmitter 1 may include two arms.

The optical transmitter 1 includes four amplifiers 21-24, but the number of amplifiers in the optical transmitter 1 is not limited to four. In this case, the optical transmitter 1 may alternatively configure the arms 41a-42b to be differentially driven.

(Operation)

Next, description will now be made in relation to operation performed by the optical transmitter 1 with reference to FIGS. 13-16.

Figure 13:
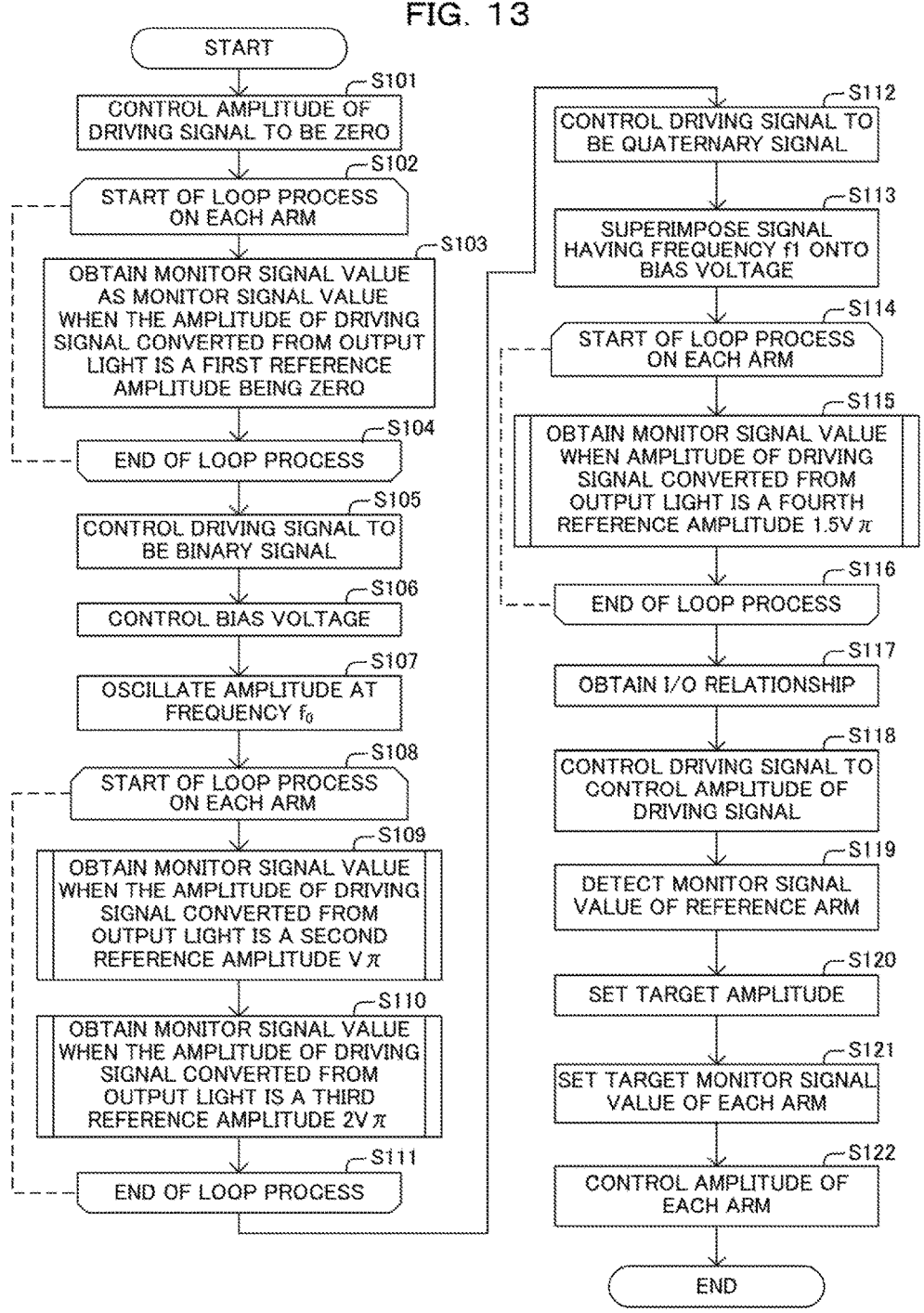
FIG. 13 is a flow diagram denoting an example of a succession of procedural steps performed in a controller of FIG. 4 to control an amplitude of a driving signal.

In this embodiment, the controller 60 executes the process of the flow diagram of FIG. 13 when the optical transmitter 1 is started. Alternatively, the controller 60 may execute the process of FIG. 13 each time certain control cycle passes.

Upon starting the process of FIG. 13, the controller 60 firstly controls each driving signals to be served as the driving signals that obtain the respective Input and output relations. Then the controller 60 controls the amplitudes of the driving signals to be zero (step S101 of FIG. 13).

Next, the controller 60 carries out a loop process on each of the four arms 41a-42b (steps S102-S104 of FIG. 13).

In the loop process, the controller 60 obtains a monitor signal value of one of the arms 41a-42b being processed to be a monitor signal value as the driving signal amplitude converted from the output light is the first reference amplitude 0 (step S103 of FIG. 13).

After carrying out the loop process (steps S102-S104 of FIG. 13) on all the four arms 41a-42b, the controller 60 proceeds to step S105 of FIG. 13, where the controller 60 controls the driving signals to binary signals (step S105 of FIG. 13).

Then the controller 60 controls the bias voltage to be a reference bias voltage V0 (step S106 of FIG. 13). Next, the controller 60 oscillates the amplitude for the operating frequency of the driving signal at the frequency $f_0$ lower than the operating frequency.

Then the controller 60 carries out another loop process (steps S108-S111 of FIG. 13) on each of the four arms 41a-42b.

In the loop process, the controller 60 firstly obtains a monitor signal value of one of the arms 41a-42b being processed as the driving signal amplitude converted from the output light is the second reference amplitude $V\pi$ (step S109 of FIG. 13). The process performed in step S109 of FIG. 13 will be detailed below.

In succession, the controller 60 obtains a monitor signal value of one of the arms 41a-42b being processed as the driving signal amplitude converted from the output light is the third reference amplitude $2V\pi$ (step S110 of FIG. 13). The process performed in step S110 of FIG. 13 will be detailed below.

After carrying out the loop process (steps S108-S111 of FIG. 13) on all the four arms 41a-42b, the controller 60 stops oscillation of the amplitude of the driving signal. Then the controller 60 controls the driving signal to be a 4-level signal (step S112 of FIG. 13).

Then the controller 60 superimposes a signal having a frequency $f_1$ lower than the operating frequency of the driving signal onto the bias voltage (step S113 of FIG. 13).

Then the controller 60 carries out an additional loop process on each of the four arms 41a-42b (steps S114-S116 of FIG. 13).

In the loop process, the controller 60 obtains a monitor signal value of one of the arms 41a-42b being processed as the driving signal amplitude converted from the output light is near to the fourth reference amplitude $1.5V\pi$ (step S115 of FIG. 13). The process performed in step S115 of FIG. 13 will be detailed below.

After carrying out the loop process (steps S114-S116 of FIG. 13) on all the four arms 41a-42b is accomplished, the controller 60 stops oscillation of the bias voltage. In succession, the controller 60 obtains, for the four arms 41a-42b, the first to fourth Input and output relations using the obtained monitor signal values (step S117 of FIG. 13).

Next, the controller 60 controls each driving signal to serve as the driving signal to control the driving signal amplitude (step S118 of FIG. 13). Then the controller 60 detects the monitor signal value of the reference arm 41a (step S119 of FIG. 13).

Next, in the manner denoted in FIG. 7, the controller 60 determines the target amplitude VXI on the basis of the first Input and output relation cXI obtained for the reference arm 41a and the monitor signal value mXI obtained for the reference arm 41a (step S120 of FIG. 13).

Then, in the manner denoted in FIG. 8, the controller 60 determines target monitor signal values mXQ, mYI, and mYQ on the basis of the target amplitude VXI and the second to fourth Input and output relations cXQ, cYI, and cYQ obtained for the non-reference arms (step S121 of FIG. 13).

Next, the controller 60 controls the amplitudes of the driving signals for the non-reference arms 41b, 42a, and 42b such that the monitor signal values of the non-reference arms 41b, 42a, and 42b approach the respective target monitor signal values mXQ, mYI, and mYQ (step S122 of FIG. 13).

Then the controller 60 finishes the process of FIG. 13.

The process of obtaining a monitor signal value for each reference amplitude may be carried out in different order from that of the process of FIG. 13.

Here, the process of step S109 of FIG. 13 will now be detailed.

Figure 14:
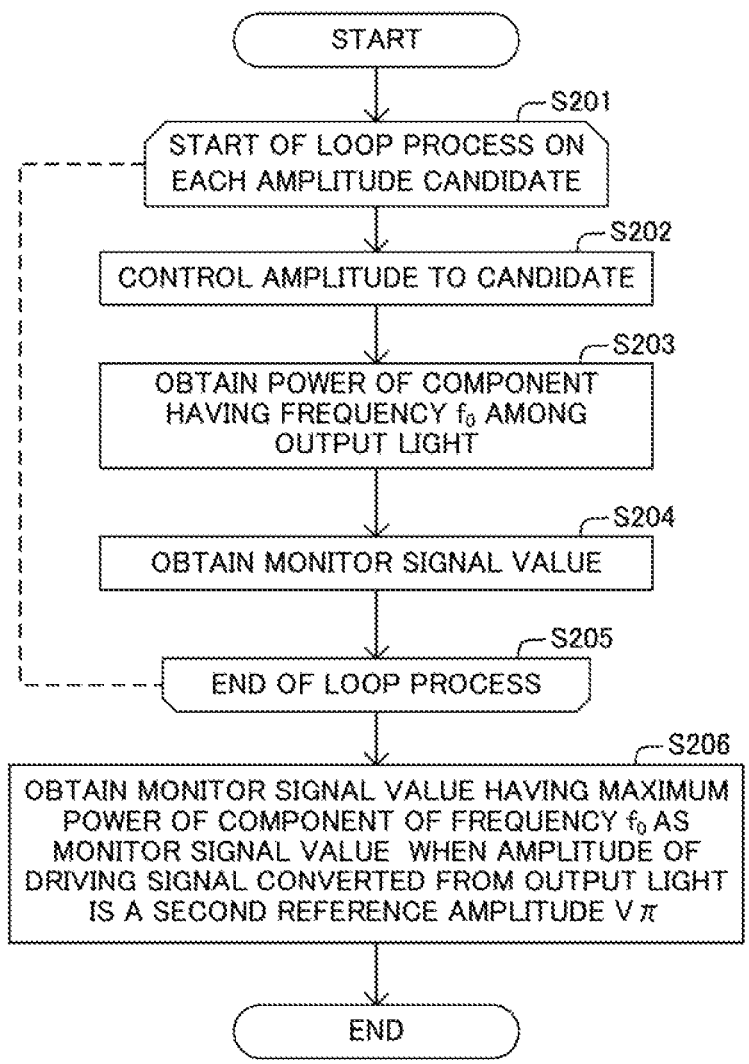
FIG. 14 is a flow diagram denoting an example of a succession of procedural steps performed in a controller of FIG. 4 to obtain a monitor signal value when a driving signal amplitude converted from the output light is a second reference amplitude.

The controller 60 executes the process of the flow diagram FIG. 14 as step S109 of FIG. 13. Accordingly, the controller 60 firstly prepares multiple candidates for the amplitude for the operating frequency of the driving signal. For example, the controller 60 may repeat a process of adding a certain increment (e.g., 0.1 V) to the lower limit of the second amplitude range until the result of the addition exceeds the upper limit of the second amplitude range, and may thereby generate the results of the addition to be the candidates.

The controller 60 performs a loop process (steps S201-S205 of FIG. 14) on each of the multiple amplitude candidates.

In the loop process, the controller 60 firstly controls the amplitude for the operating frequency of the driving signal to be one of the candidates being processed (step S202 of FIG. 14). Then the controller 60 obtains the power of the frequency-$f_0$ component among the output lights from one of the arms 41a-42b being processed (step S203 of FIG. 14). After that, the controller 60 obtains the monitor signal value of the one of the arms 41a-42b being processed (step S204 of FIG. 14).

Alternatively, steps S203-S204 may be performed in a different order of FIG. 14.

After performing the loop process (steps S201-S205 of FIG. 14) on all the multiple candidates, the controller 60 moves to step S206 of FIG. 14. Then the controller 60 obtains the monitor signal value having the maximum power of the obtained frequency-$f_0$ component to be the monitor signal value as the driving signal amplitude converted from the output light is the second reference amplitude $V\pi$ (step S206 of FIG. 14). Then the controller 60 ends the process of FIG. 14.

Next, description will now be made in relation to step S110 of FIG. 13.

Figure 15:
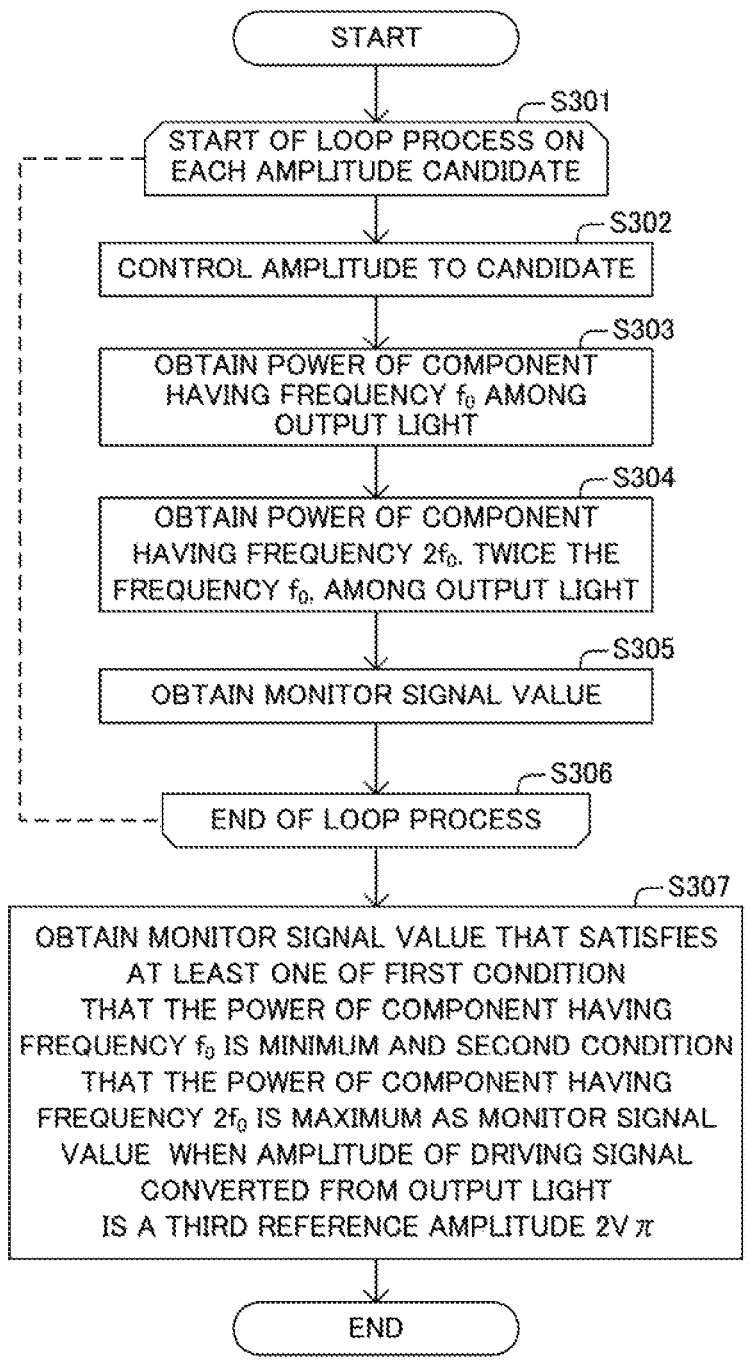
FIG. 15 is a flow diagram denoting an example of a succession of procedural steps performed in a controller of FIG. 4 to obtain a monitor signal value when a driving signal amplitude converted from output light is a third reference amplitude.

The controller 60 carries out a process of the flow diagram FIG. 15 for step S110 of FIG. 13. Accordingly, the controller 60 firstly prepares multiple candidates for the amplitude for the operating frequency of the driving signal. For example, the controller 60 may repeat a process of adding a certain increment (e.g., 0.1 V) to the lower limit of the third amplitude range until the result of the addition exceeds the upper limit of the third amplitude range, and may thereby generate the results of the addition to be the candidates.

The controller 60 performs a loop process (steps S301-S306 of FIG. 15) on each of the multiple amplitude candidates.

In the loop process, the controller 60 firstly controls the amplitude for the operating frequency of the driving signal to be one of the candidates being processed (step S302 of FIG. 15). Then the controller 60 obtains the power of the frequency-$f_0$ component among the output lights from one of the arms 41a-42b being processed (step S303 of FIG. 15). Then the controller 60 obtains the power of the frequency-$2f_0$ component among the output light from the one of the arms 41a-42b being processed (step S304 of FIG. 15).

Then the controller 60 obtains the monitor signal value for the one of the arms 41a-42b being processed (step S305 of FIG. 15).

Alternatively, steps S303-S305 may be performed in a different order of FIG. 15.

After carrying out the above loop process (steps S301-S306 of FIG. 15) on all the amplitude candidates, the controller 60 moves to step S307 of FIG. 15. In succession, the controller 60 obtains a monitor signal value that satisfies at least one of a first condition that the obtained power of the frequency-$f_0$ component is minimum and a second condition that the obtained power of the frequency-$2f_0$ component is maximum as the monitor signal is value when the driving signal amplitude converted from the output light is the third reference amplitude $2V\pi$ (step S307 of FIG. 15). Then, the controller 60 finishes the process of FIG. 15.

For example, the controller 60 obtains, as the monitor signal value when the driving signal amplitude converted from the output light is the third reference amplitude $2V\pi$, a monitor signal having an obtained power of the frequency-$f_0$ component being minimum and also having an obtained power of the frequency-$2f_0$ component being maximum; a monitor signal having an obtained power of the frequency-$f_0$ component being minimum and also having an obtained power of the frequency-$2f_0$ component not being maximum; or a monitor signal having an obtained power of the frequency-$f_0$ component not being minimum and also having an obtained power of the frequency-$2f_0$ component being maximum.

Next, the process of step S115 of FIG. 13 will now be detailed.

Figure 16:
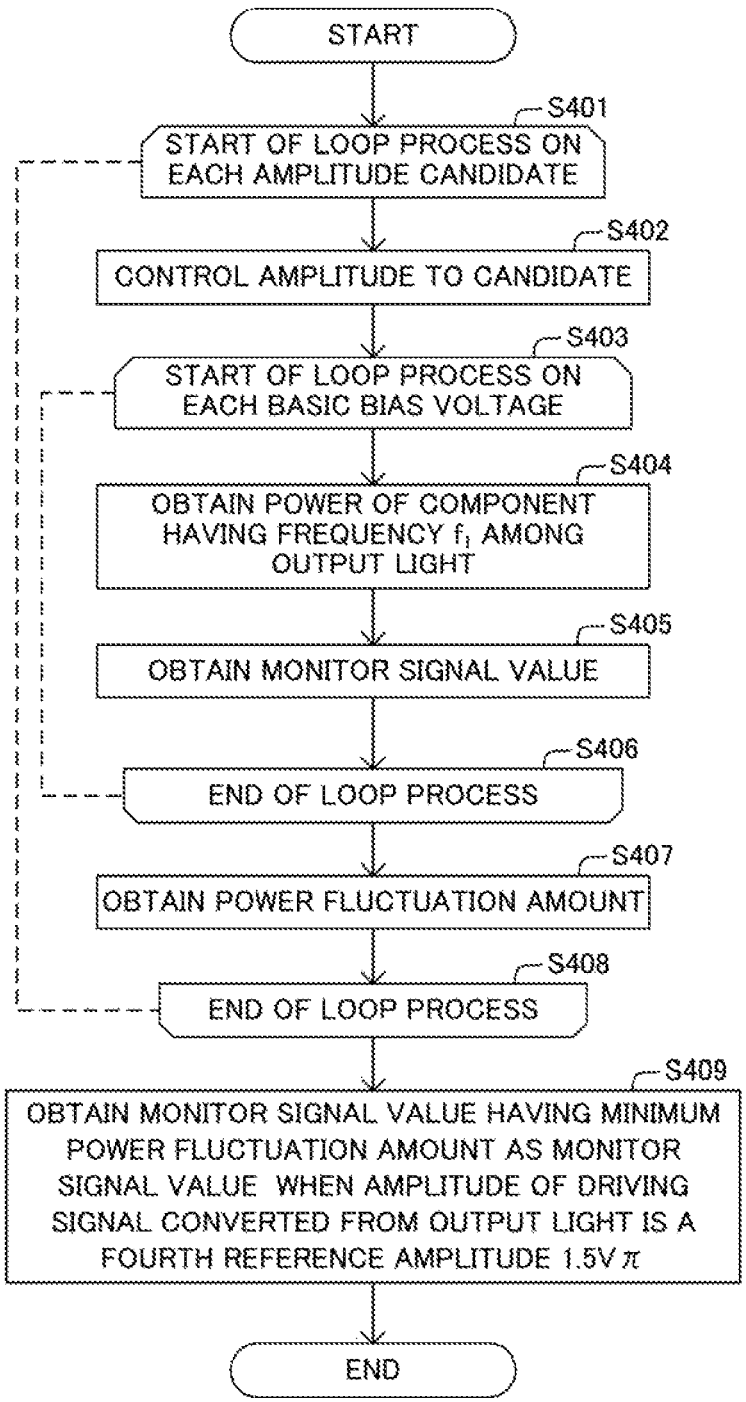
FIG. 16 is a flow diagram denoting an example of a succession of procedural steps performed in a controller of FIG. 4 to obtain a monitor signal value when a driving signal amplitude converted from output light is a fourth reference amplitude.

The controller 60 carries out a process of the flow diagram FIG. 16 for the process of step S115 of FIG. 13. Firstly, the controller 60 prepares multiple amplitude candidates for an is amplitude of the operating frequency of the driving signal. For example, the controller 60 may repeat a process of adding a certain increment (e.g., 0.1 V) to the lower limit of the first amplitude range until the result of the addition exceeds the upper limit of the first amplitude range, and regard the result of each addition as the amplitude candidates.

The controller 60 carries out a first loop process (steps S401-S408 of FIG. 16) on each of the amplitude candidates.

In the first loop process, the controller firstly controls the amplitude of the operating frequency of the driving signal to one of the candidates being processed (step S402 of FIG. 16).

In the first loop process, the controller then prepares multiple basic bias voltages. For example, the controller 60 may repeat a process of adding a certain increment (e.g., 1 V) to the lower limit of the voltage range until the result of the addition exceeds the upper limit of the voltage range, and regard the result of each addition as the basic bias voltages.

The controller 60 carries out a second loop process on each of the multiple basic bias voltages (steps S403-S406 of FIG. 16).

In the second loop process, the controller 60 firstly obtains a power of the frequency-$f_1$ component among output light from one of the arms 41a-42b being processed (step S404 of FIG. 16). In succession in the second loop process, the controller 60 obtains a monitor signal value of the arm being processed (step S405 of FIG. 16).

Here, steps S404-S405 may be carried out in a different order from that described in FIG. 16.

After carrying out the above second loop process (steps S403-S406 of FIG. 16) on all the basic bias voltages, the controller 60 moves to step S407 of FIG. 16. In succession, the controller 60 obtains a power fluctuation amount of the amplitude candidate being processed on the basis of the obtained power of the frequency-$f_1$ component (step S407 of FIG. 16).

After carrying out the first loop process (steps S401-S408 of FIG. 16) on all the amplitude candidates, the controller 60 moves to step S409 of FIG. 16. In succession, the controller 60 obtains a monitor signal value having the obtained power fluctuation amount being minimum as a monitor signal when a driving signal amplitude converted from the output light is near to the fourth reference amplitude $1.5 V\pi$ (step S409 of FIG. 16). Then the controller 60 ends the process of FIG. 16.

As described above, in the optical transmitter 1 of the first embodiment, the controller 60 obtains the Input and output relation between a fluctuation of a monitor signal value and a fluctuation of the "driving signal amplitude converted from the output signal" due to a fluctuation in the monitor signal value. Furthermore, the controller 60 controls the amplitude of the driving signal on the basis of the obtained Input and output relation.

This can control the amplitude of the driving signal such that the output light from each of the arms 41a-42b comes to be in a desired target state, so that the state of the output light from each of the arms 41a-42b can be precisely controlled to be in the desired target state. Consequently, the quality of the light signal can be enhanced.

Additionally, in the optical transmitter according to the first embodiment, the controller detects the monitor signal value when the output light is in the state corresponding to a reference amplitude and obtains the Input and output relation based on the obtained monitor signal value. Furthermore, the controller 60 determines the target monitor value based on the obtained Input and output relation such that the output light is in the target state corresponding to an amplitude different from the reference amplitudes. The controller 60 also controls the amplitude of the driving signal such that the monitor signal value approaches the target monitor signal value.

Accordingly, the output light from each of the arms 41a-42b can approach a target state corresponding to an amplitude different from the reference amplitudes, so that the quality of the light signal can be enhanced.

In addition, in the optical transmitter 1 of the first embodiment, the controller 60 detects the monitor signal value and obtains the Input and output relation for each of the multiple arms 41a-42b. The controller 60 also determines the target amplitude on the basis of the Input and output relation obtained for the reference arm 41a, and determines the target monitor signal values on the basis of the determined target amplitude and the Input and output relations obtained for the non-reference arms 41b-42b.

Besides, the controller 60 controls the amplitude of the driving signal of each of the non-reference arms 41b-42b such that the monitor signal values of the non-reference arms approach the determined target monitor signal values, respectively.

This allows the state of the output lights from the non-reference arms 41b-42b to approach the state of the output light from the reference arm 41a. In other words, the variation of the states of the output lights from the respective arms can be suppressed.

Furthermore, in the optical transmitter 1 of the first embodiment, the controller 60 detects the monitor signal value for each of multiple reference amplitudes being different from one another and obtains a polynominal representing the Input and output relation on the basis of the detected monitor signal values.

This can obtain a precise relationship between a fluctuation of a monitor signal and a fluctuation of "the driving signal amplitude converted from the output light" due to the fluctuation of the monitor signal value. This can consequently enhance the quality of the light signal.

<Second Embodiment>

Next, an optical transmitter according to a second embodiment of the present disclosure will now be described. The optical transmitter of the second embodiment is different from the optical transmitter of the first embodiment in the point that the optical transmitter of the second embodiment controls the amplitude of each driving signal so as to compensate for the aged change of the Input and output relation due to, for example, aged deterioration of the amplifier. The following description will focus on the difference. In the following description, like reference numbers designate the same or the substantially same elements and parts detailed in the above first embodiment.

The amplitude controller 62 of the second embodiment detects a monitor signal value for each of the arms 41a-42b at the first time point immediately after the amplitude of the driving signal is controlled as described in the first embodiment. The amplitude controller 62 holds the monitor signal values detected for the respective arms 41a-42b.

After the first time point, the amplitude controller 62 detects the monitor signal values for the respective arms 41a-42b each time a certain periodic cycle elapses. The amplitude controller controls the amplitude of the driving signals for the respective arms 41a-42b on the basis of the detected monitor signal values and the held monitor signal values.

In this embodiment, when the detected monitor signal value is larger by a value equal to or more than a certain threshold than the held monitor signal, the amplitude controller 62 decreases the amplitude of the driving signal by a certain first adjusting amount. The threshold of this embodiment is a positive value. Conversely, when the detected monitor signal value is smaller by a value equal to or more than a certain threshold than the held monitor signal, the amplitude controller 62 increases the amplitude of the driving signal by a certain second adjusting amount. The first and second adjusting amounts of this embodiment are positive values and are different from each other. Alternatively, the first and second adjusting amounts may be the same value.

After carrying out the process of FIG. 13, the controller 60 of the second embodiment detects a monitor signal value for each of the arms 41a-42b, and holds the detected monitor signal value as a reference value. In succession, the controller 60 carries out a process performed by the flow diagram FIG. 17 each time a certain obtaining period elapses. Alternatively, after executing the process of FIG. 13, the controller 60 may carry out the process of FIG. 17 a certain number of times.

At the start of the process of FIG. 17, the controller 60 carries out a loop process (step S501-S507 of FIG. 17) on each of the four arms 41a-42b.

In the loop process, the controller 60 firstly detects the monitor signal value for one of the arms 41a-42b being processed (step S502 of FIG. 17). Then, the controller 60 determines, for each of the arms 41a-42b being processed, whether the is absolute value of the difference between the detected monitor signal value and the held reference value is larger than a threshold (step S503 of FIG. 17).

If the absolute value of the difference is larger than the threshold, the controller 60 determines "Yes" in step S503 of FIG. 17 and moves to step S507. In contrast, if the absolute value of the difference is equal to or smaller than the threshold, the controller 60 determines "No" in step S503 of FIG. 17 and moves to step S504.

Next, the controller 60 determines, for the arm being processed, whether or not the detected monitor signal value is larger than the held reference value (step S504 of FIG. 17).

If the monitor signal value is larger than the reference value, the controller 60 determines "Yes" in step S504 of FIG. 17, and decreases the amplitude of the driving signal of the arm being processed by the first adjusting amount (step S505 of FIG. 17). In contrast, if the monitor signal value is equal to or less than the reference value, the controller 60 determines "No" in step S504 of FIG. 17 and increases the amplitude of the driving signal of the arm being processed by the second adjusting amount (step S506 of FIG. 17).

After carrying out the loop process (steps S501-S507 of FIG. 17) on all the four arms 41a-42b, the controller 60 ends the process of FIG. 17.

As the above, in the optical transmitter 1 of the second embodiment, the controller 60 detects a monitor signal value at a first time point and a second time point after the first time point. Furthermore, the controller 60 controls the amplitude of each driving signal on the basis of the monitor signal values detected at the first and second time points.

The Input and output relation sometimes fluctuates as the passage of time. To deal with this fluctuation, the controller 60 of the second embodiment can control the amplitude of a driving signal so as to compensate for the temporal fluctuation of the Input and output relation. Accordingly, the quality of the light signal achieved by executing the process of FIG. 13 can be sustained. In other words, the quality of the light signal can be enhanced.

The monitor signal value of a particular arm sometimes has difficulty in satisfactorily approaching the reference value due to, for example, temporal deterioration of the amplifiers 21-24. In this case, the controller 60 may use a particular arm as a reference arm to carry out the process of FIG. 13. This can approach the states of the output lights from the arms 41a-42b to one another. Namely, the variation of the states of the output lights from the respective arms can be suppressed.

According to the above disclosure, the quality of a light signal can be enhanced.

All examples and conditional language provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
   an optical modulator that is driven by a driving signal;
   a controller that
   for each of a plurality of reference amplitudes, detects a parameter to adjust the driving signal when an output light from the optical modulator is in a state corresponding to a reference amplitude,
   obtains a relationship between the parameter and the amplitude corresponding to the state of the output light based on the detected parameter and the plurality of the reference amplitudes, and
   controls an amplitude of the driving signal on the basis of the obtained relationship such that the parameter approaches a target parameter.

2. The optical transmitter according to claim 1, wherein:
   a light intensity of the output light from the optical modulator fluctuates at a periodic cycle in accordance with a fluctuation of the driving signal;
   when the output light from the optical modulator is in a state corresponding to a reference amplitude obtained by multiplying the amplitude of the driving signal by a coefficient equal to or more than zero and equal to or less than one, the controller detects the parameter, and determines the target parameter based on the obtained relationship, the target parameter causing the output light to be in a target state corresponding to an amplitude different from the reference amplitude.

3. The optical transmitter according to claim 2, further comprising a plurality of the optical modulators, wherein:
   the controller detects the parameter and obtains the relationship for each of the plurality of optical modulators, and determines the target state based on the relationship obtained for a first optical modulator among the plurality of optical modulators, determines the target parameter based on the determined target state and the relationship obtained for a second optical modulator among the plurality of optical modulators, and controls the amplitude of the driving signal that drives the second optical modulator such that the parameter for the second optical modulator approaches the determined target parameter.

4. The optical transmitter according to claim 2, wherein the controller obtains a polynomial representing the relationship on the basis of the plurality of detected parameters.

5. The optical transmitter according to claim 2, wherein:
   the controller controls the driving signal to be a quaternary signal, and determines, when a fluctuation amount of a power of a component having a first frequency among the output light from the optical modulator is minimum among amplitudes of the driving signal in a first range under a state where a bias voltage applied to the optical modulator is oscillated at the first frequency lower than the frequency of the driving signal with respect to a basic bias voltage as the center of the oscillation and the basic bias voltage is varied in a voltage range, that the output light is in a state corresponding to the reference amplitude near to an amplitude obtained by multiplying the amplitude of the driving signal corresponding to the periodic cycle by ¾.

6. The optical transmitter according to claim 2, wherein:
   the controller controls the driving signal to be a binary signal, and determines, when a power of a component having a second frequency among the output light from the optical modulator is maximum among amplitudes of the driving signal in a second range under a state where the amplitude of the driving signal is oscillated at the second frequency lower than the frequency of the driving signal, that the output light is in a state corresponding to the reference amplitude obtained by multiplying the amplitude of the driving signal corresponding to the periodic cycle by ½.

7. The optical transmitter according to claim 2, wherein:
   the controller controls the driving signal to be a binary signal, and determines, when at least one of a first condition that a power of a component having a third frequency among the output light from the optical modulator is minimum among amplitudes of the driving signal in a third range and a second condition that a power of a component having twice a third frequency among the output light from the optical modulator is maximum among the amplitudes of the driving signal in the third range is satisfied under a state where the amplitude of the driving signal is oscillated at the third frequency lower than the frequency of the driving signal, that the output light is in a state corresponding to the reference amplitude equal to the amplitude of the driving signal corresponding to the periodic cycle.

8. The optical transmitter according to claim 2, wherein:
   the controller detects two of the parameters at a first time point and a second time point after the first time point, and controls the amplitude of the driving signal on the basis of the detected parameters detected at the first time point and the second time point.

9. The optical transmitter according to claim 1, wherein the controller controls the amplitude of the driving signal by controlling at least one of an electric signal generator that generates an electric signal and an amplifier that amplifies the generated electric signal and outputs the amplified electric signal as the driving signal.

10. A method for controlling an optical modulator that is driven by a driving signal, the method comprising:
    detecting a parameter to adjust the driving signal when an output light from the optical modulator is in a state corresponding to a reference amplitude for each of a plurality of reference amplitudes,
    obtaining a relationship between the parameter and the amplitude corresponding to the state of the output light based on the detected parameter and the plurality of the reference amplitudes, and
    controlling an amplitude of the driving signal on the basis of the obtained relationship such that the parameter approaches a target parameter.

11. The method according to claim 10, wherein:
    a light intensity of the output light from the optical modulator fluctuates at a periodic cycle in accordance with a fluctuation of the driving signal;
    when the output light from the optical modulator is in a state corresponding to a reference amplitude obtained by multiplying the amplitude of the driving signal by a coefficient equal to or more than zero and equal to or less than one, detecting the parameter, and determining the target parameter based on the obtained relationship, the target parameter causing the output light to be in a target state corresponding to an amplitude different from the reference amplitude.

12. The method according to claim 11, further comprising:

detecting the parameter and obtaining the relationship for each of the plurality of optical modulators; and determining the target state based on the relationship obtained for a first optical modulator among the plurality of optical modulators, determining the target parameter based on the determined target state and the relationship obtained for a second optical modulator among the plurality of optical modulators, and controlling the amplitude of the driving signal that drives the second optical modulator such that the parameter for the second optical modulator approaches the determined target parameter.

13. A controller controls is configured to control an optical modulator that is driven by a driving signal;

detects a parameter to adjust the driving signal when an output light from the optical modulator is in a state corresponding to a reference amplitude for each of a plurality of reference amplitudes;

obtains a relationship between the parameter and the amplitude corresponding to the state of the output light based on the detected parameter and the plurality of the reference amplitudes; and controls an amplitude of the driving signal on the basis of the obtained relationship such that the parameter approaches a target parameter.

14. The controller according to claim 13, wherein:

a light intensity of the output light from the optical modulator fluctuates at a periodic cycle in accordance with a fluctuation of the driving signal;

when the output light from the optical modulator is in a state corresponding to a reference amplitude obtained by multiplying the amplitude of the driving signal by a coefficient equal to or more than zero and equal to or less than one, the controller detects the parameter, and determines the target parameter based on the obtained relationship, the target parameter causing the output light to be in a target state corresponding to an amplitude different from the reference amplitude.

15. The controller according to claim 14, wherein:

the controller detects the parameter and obtains the relationship for each of the plurality of optical modulators, and determines the target state based on the relationship obtained for a first optical modulator among the plurality of optical modulators, determines the target parameter based on the determined target state and the relationship obtained for a second optical modulator among the plurality of optical modulators, and controls the amplitude of the driving signal that drives the second optical modulator such that the parameter for the second optical modulator approaches the determined target parameter.

* * * * *